United States Patent
Forslöw

(10) Patent No.: US 6,954,790 B2
(45) Date of Patent: Oct. 11, 2005

(54) NETWORK-BASED MOBILE WORKGROUP SYSTEM

(75) Inventor: Jan Forslöw, Stockholm (SE)

(73) Assignee: Interactive People Unplugged AB (SE)

( * ) Notice: Subject to any disclaimer, the term of this patent is extended or adjusted under 35 U.S.C. 154(b) by 777 days.

(21) Appl. No.: 09/729,199

(22) Filed: Dec. 5, 2000

(65) Prior Publication Data

US 2002/0069278 A1 Jun. 6, 2002

(51) Int. Cl.[7] .......................... G06F 15/16; H04Q 7/20
(52) U.S. Cl. ................. 709/227; 709/205; 455/461
(58) Field of Search ........................ 709/203, 224, 709/227, 204, 205, 229; 370/328, 397, 352, 401, 329; 455/555, 554.1, 461, 554, 414

(56) References Cited

U.S. PATENT DOCUMENTS

| | | | | |
|---|---|---|---|---|
| 5,572,528 A | * | 11/1996 | Shuen | 370/402 |
| 5,825,759 A | * | 10/1998 | Liu | 370/331 |
| 6,424,657 B1 | * | 7/2002 | Voit et al. | 370/412 |
| 6,445,920 B1 | * | 9/2002 | Pfundstein | 455/422.1 |
| 6,487,600 B1 | * | 11/2002 | Lynch | 709/229 |
| 6,539,483 B1 | * | 3/2003 | Harrison et al. | 713/201 |
| 6,560,217 B1 | * | 5/2003 | Peirce et al. | 370/351 |
| 6,571,289 B1 | * | 5/2003 | Montenegro | 709/227 |
| 6,717,921 B1 | * | 4/2004 | Aggarwal et al. | 370/256 |
| 2001/0033556 A1 | * | 10/2001 | Krishnamurthy et al. | 370/329 |
| 2002/0004817 A1 | * | 1/2002 | Pham et al. | 709/203 |
| 2002/0006133 A1 | * | 1/2002 | Kakemizu et al. | 370/401 |
| 2002/0013150 A1 | * | 1/2002 | McKenna et al. | 455/430 |
| 2003/0179742 A1 | * | 9/2003 | Ogier et al. | 370/351 |

OTHER PUBLICATIONS

Supporting nomadic users within virtual private networks Karnouskos, S. Service Portability and Virtual Customer Environments,2000 IEEE, vol., Iss., 2000 pp.: 128–133 URL: http://ieeexplore.ieee.org/iel5/7436/20219/00934172.pdf?isNumber=20219&prod=STD&.*

* cited by examiner

*Primary Examiner*—Ario Etienne
*Assistant Examiner*—Uzma Alam
(74) *Attorney, Agent, or Firm*—Banner & Witcoff, Ltd.

(57) ABSTRACT

A network-based mobile workgroup system has considerably wider appeal and application than normal virtual private networks in that it provides seamless mobility across a number of access technologies at the same time as it offers a granular security separation down to workgroup level. The mobile workgroup system is an access management system for mobile users with VPN and firewall functionality inbuilt. The mobile user can access the mobile workgroup system over a set of access technologies and select server resources and correspondent nodes to access pending their workgroup membership approvals. All workgroup policy rules are defined in a mobile service manager and pushed down to one or more mobile service routers for policy enforcement. The mobile service router closest to the mobile client, and being part of the mobile virtual private network, performs regular authentication checks of the mobile client during service execution. At the same time it performs traffic filtering based on the mobile user's workgroup memberships. Together, these two components constitute an unprecedented security lock, effectively isolating a distributed workgroup into a mobile virtual private network.

101 Claims, 16 Drawing Sheets

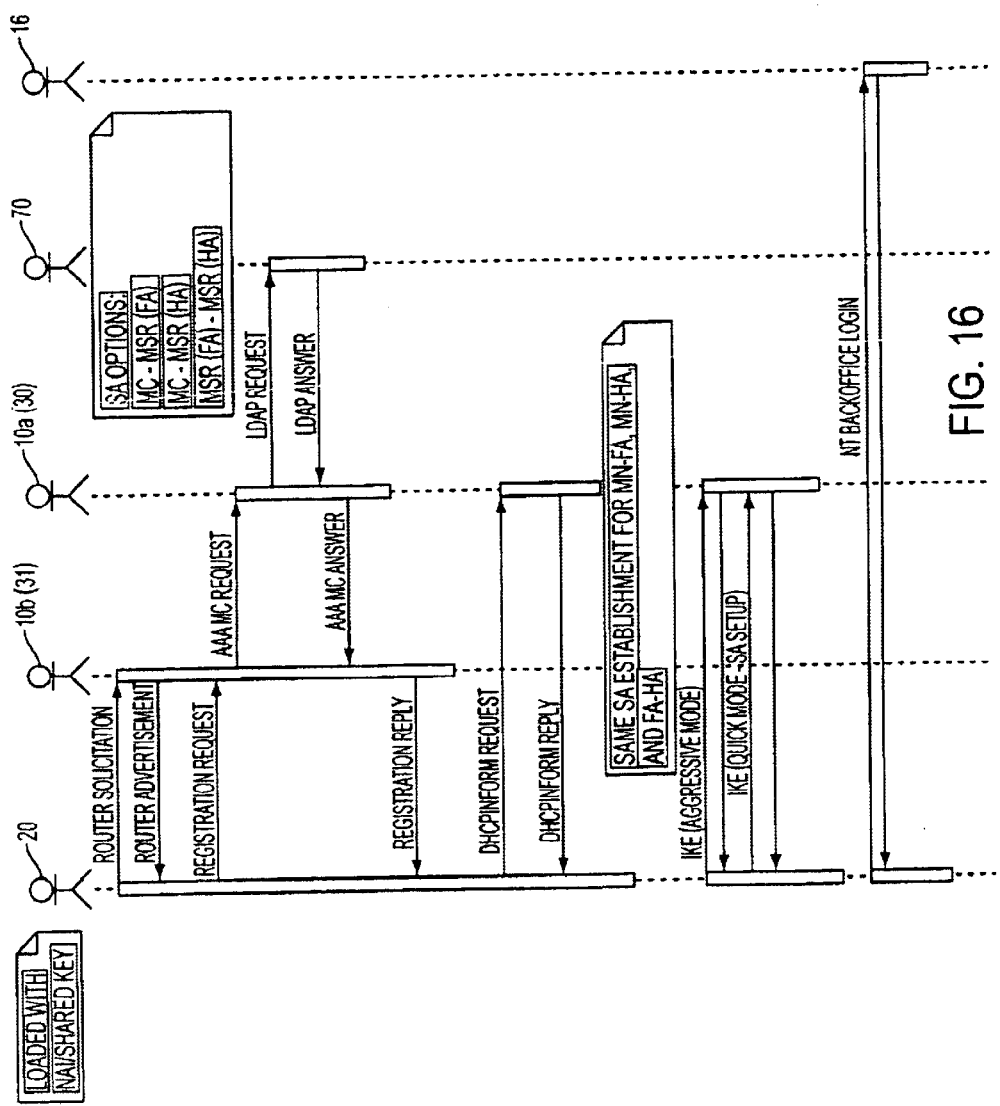

NETWORK-BASED MOBILE WORKGROUP SYSTEM

FIELD OF THE INVENTION

The present invention relates to data communications in general, and more specifically, the present invention describes a network-based mobile workgroup system that provides secure communication to and within an overlaid workgroup network while applying mobility management for the workgroup members.

BACKGROUND AND SUMMARY OF THE INVENTION

The following definitions are introduced for the purpose of clarity.

AAA, Authentication, Authorization and Accounting. AAA is a common name for both RADIUS and DIAMETER, i.e. solutions providing for customer care, control and billing in a large IP network.

BGP, Border Gateway Protocol. BGP is a inter-domain protocol defined by IETF for sharing routes between ISPs. A route is a collection of knowledge of a path from a source to a destination (host).

cdma2000. Code Division Multiple Access 2000 is the North American version of the 3rd generation mobile cellular technology (IMT-2000) for access speeds up to 2 Mbit/s per Mobile Node. cdma2000 is a trade name for 3G systems based on the cdma2000 radio access standards, as well as name identifying the radio access itself.

DIAMETER. A successor of RADIUS with increased security and scalability features. It is standardized by IETF.

DHCP, Dynamic Host Configuration Protocol. DHCP is an Internet Engineering Task Force (IETF) standard for allocating Internet Protocol addresses to User Systems. User Systems can either be Fixed Hosts or Mobile Systems. The allocation is done each time when the User System is started. The allocation is made by a DHCP server to a DHCP client. The DHCP server is controlled by an Internet Service Provider or an IT-department. The DHCP client is a SW embedded in the User System.

DMZ, De-Militarized Zone is a zone between the Internet Service Provider router and Corporate firewall where access is allowed from both the Internet and the Intranet. Normally a subset of the services available on the Intranet is mirrored on the DMZ.

FA, Foreign Agent. The primary responsibility of an FA is to act as a tunnel agent which establishes a tunnel to a HA on behalf of a mobile node in Mobile IP.

HA, Home Agent. One responsibility of the HA is to act as a tunnel agent which terminates the tunnel, and which encapsulates datagrams to be sent to the Mobile Node in Mobile IP.

IETF, Internet Engineering Task Force. IETF is the standardization organization for the Internet community.

IP, Internet Protocol. IP is a network layer protocol according to the ISO protocol layering. IP is the major end-to-end protocol between Mobile and Fixed End-Systems for Data Communications. It is also used in Radio Datacommunications Systems as an underlying transport technology for Tunneling Protocols.

ISP, Internet Service Provider. The ISP is a notation for the domain providing basic IP configuration services to users, i.e. servers for Domain Name System (DNS) and Dynamic Host Configuration Protocol (DHCP).

LDAP, Lightweight Directory Access Protocol is a slim variant of the X.500 Directory Access Protocol for accessing data storage areas such as user databases.

MANET, Mobile Ad hoc Networks is a common name for a family of protocols that provide multi-hop routing in highly dynamic mobile environments.

MIB, Management Information Base. IETF defines a number of MIBs for allowing management via the SNMP (Simple Network Management Protocol) of network elements. The format of a MIB is standard. The content can either be proprietary or standardized.

MIP, Mobile IP. MIP is a standard being defined by IETF on making IP networks mobility aware, i.e. having knowledge on where a Mobile Node is attached to the network. The standard includes the definition of a Foreign Agent and a Home Agent.

MC, Mobile Client. The MC comprises both the Terminal (TE) and the Mobile Termination (MT).

RADIUS, Remote Authentication Dial-In User Service. RADIUS is the currently, widely deployed AAA protocol. It is a protocol for carrying authentication, authorization, configuration and accounting information between a network access server and an ISP RADIUS server.

RAN, Radio Access Network. RAN is the common acronym used for various types of radio access networks in 3G networks, e.g. cdma2000 and UMTS/WCDMA.

SLA, Service Level Agreement. SLA is the common name for a set of terms agreed with the customer on the quality of service that the ISP shall provide. The SLA can related to availability, latency and throughput of network resources.

UMTS, Universal Mobile Telecommunications System. UMTS is the European version for the 3rd generation mobile cellular technology (IMT-2000) for access speeds up to 2 Mbit/s per Mobile Node. One specie radio technology in UMTS is WCDMA.

VLAN, Virtual Local Area Network is a separation of a physical Local Area Network into a set of logical subnets.

VPN, Virtual Private Network is a secure overlay network on a common public infrastructure that allows a corporation to maintain its own addressing and routing between its sites and to remote users.

WLAN, Wireless Local Area Network. WLAN is a local area solution for radio access mobility with speed up to 11 Mbit/s per Mobile Node.

While Internet technologies largely succeed in overcoming the barriers of distance, time and space, existing technologies have yet to fully accommodate the increasing mobility of people with their computers. In order to eliminate this barrier, this invention introduces modifications to the very base of how packets are routed over the Internet by a mobility routing protocol in the core of a mobile virtual private network together with using mobile IP at its edge.

Similarly, as IP networks has evolved to support external business partners and remote access traffic, the traditional approaches to network security fall short. They do not provide the level of granularity needed to control access to sensitive resources. Here again there is a need to change some of the traditional aspects of internetworking. This invention proposes changes to the perimeter security of a corporate network to include user authentication and workgroup level filtering at the point where a mobile client attaches to the workgroup network.

The introduction of 3G mobile networks is all set to make a huge difference to the international business community.

3G networks will provide sufficient bandwidth to run most of the business computer applications providing a reasonable user experience. However, 3G networks are not based on only one standard, but a set of radio technology standards such as cdma2000, EDGE and WCDMA. In the light of this, a common mobility management framework is required in order to allow mobile users to roam between access networks with little or no manual intervention. IETF has created a standard for this purpose called mobile IP. Mobile IP is different compared to other efforts for doing mobility management in the sense that it is not tied to one specific access technology. In earlier mobile cellular standards, such as GSM, the radio resource and mobility management was integrated vertically into one system. On the other hand, mobile IP is re-using the anchor-based mobility management architecture that has been so successfully exploited in GSM networks. Mobile IP is defining a home agent as the anchor point with which the mobile client always has a relationship, and a foreign agent, which acts as the local tunnel-endpoint at the access network where the mobile client is visiting. Depending on which subnetwork the mobile client is currently visiting its point of attachment may change. At each point of attachment, mobile IP either requires the availability of a standalone foreign agent or the usage of a co-located care-of address in the mobile client itself.

In general, the Internet protocol routes packets from a source to a destination by having routers to forward data packets from incoming network interfaces to outbound network interfaces according to routing tables. The routing tables typically maintain the next-hop (outbound interface) information for each destination IP address. The destination IP address typically carries with it information that specifies the IP client's point of attachment to the network. Correct delivery of packets to a client's point of attachment depends on the network identifier portion contained in the client's IP address, which however has to change at a new point of attachment. To alter the routing of the data packets intended for a mobile client to a new point of attachment can be solved by associating a new IP address with that new point of network attachment. On the other hand, to maintain existing transport protocol layer connections as the mobile client moves, the mobile client's IP address must remain the same.

This mobility addressing dilemma is handled in mobile IP by allowing the mobile client to be associated with two IP addresses: a static, "home" address and a dynamic, "care-of" address that changes at each new point of attachment to the Internet. Only the care-of address changes at each new point of attachment. The home IP address assigned to the mobile client makes it logically appear as if the mobile client is attached to its home network. It is the IP address where the mobile client seems to be reachable for other Internet clients and services.

A mobile agent that is provided in a home network receives traffic directed to the mobile client's home IP address when the mobile client is not attached to its home network. When the mobile client is attached to a foreign network, a home agent routes (tunnels) that traffic to a foreign agent using the mobile client's current care-of address. The care-of address, which identifies the mobile client's current, topological point of attachment to the Internet, is used by the home agent to route packets to the mobile client. If the mobile client is not attached to a foreign network, the home agent simply arranges to have the packet traffic delivered to the mobile client's current point of attachment in the home network. Whenever the mobile client moves its point of attachment, it registers a new care-of address with its home agent.

The further delivery by the home agent to the foreign agent requires that each packet intended for the mobile client be modified/extended so that the care-of address appears as the destination IP address. This modification of the packet is sometimes termed a "redirection." The home agent redirects packets from the home network to the care-of address by constructing a new IP header that contains the mobile client's care-of address as the packet's destination IP address. This new header "encapsulates" the original data packet causing the mobile client's home address to have no effect on the encapsulated packet's routing until it arrives at the care-of address. This encapsulation is commonly known as "tunneling" in the sense that the data packet burrows or tunnels using the new "routing" header through the Internet, while the encapsulated IP header is completely ignored. When the packet arrives at the foreign agent the new "routing" header is removed and the original packet is sent to the mobile client for properly processing by whatever higher level protocol (layer 4) that logically receives it from the mobile client's IP (layer 3) processing layer.

Foreign agents regularly broadcast agent advertisements that include information about one or more care-of addresses. When a mobile client receives an agent advertisement, it can obtain the IP address of that foreign agent. The mobile client may also broadcast or multicast an advertisement solicitation that will be answered by any foreign agent that receives it. Thus, the agent advertisement procedure allows for the detection of foreign agents, lets the mobile client determine is the network number and status of its link to the Internet, and identifies whether it is at home or on a foreign network. Once a mobile client receives a care-of address, a registration process is used to inform the home agent of the care-of address. The registration allows the home agent to update its routing table to include the mobile's home address, current care-of address, and a registration lifetime.

In contrast to mobile IP, a completely different approach to mobility is emerging for mobile nodes in conference and sensor environments. These mobile users need a way to deliver packets between wireless stations without the use of an infrastructure, i.e. routers. Mobile Ad hoc Networking (MANET) is a name given by IETF to the creation of such dynamic and multi-hop networks. Mobile nodes create own adhoc networks for their communication purposes as needed. Wireless LAN is often cited as the default access technology for this purpose, but also other radio technologies, such as Bluetooth, are showing great promise to be used as an radio access to MANETs. The lightweight implementation of Bluetooth allows very small devices to be part of the adhoc network and opens up for the areas of wearable computing and personal area networking.

MANET solves the problem of mobility by changing the very aspect of routing. Instead of creating tunnels as in mobile IP on top of the existing Internet routing protocols, MANET enhances the routing protocols to be both independent of IP address topology and reactive to route changes. A flat topology allows the mobile nodes to change their point of attachment in relation to each other, while still maintaining their network identity, i.e. IP address. Such propagation of individual routes in an IP network does not scale very well and that is where the second aspect of adhoc networks has its role. Reactive route propagation essentially means that a movement of a mobile node is not propagated per default as a route change to all other nodes in the network. For on-going sessions and to immediate peers, the route update is propagated directly, but for distant nodes that has no on-going communication, the route update is not propagated. A distant node will instead retrieve a route on-demand, when needed. Economical discovery and propagation of such routes is the challenge of MANET. Simple MANET protocols, such as adhoc on-demand distance vector (AODV), use pure broadcast, while advanced MANET protocols, such as topology-based routing based on reverse path forwarding (TBRPF), uses unicast or broadcast depending on the position of the peer in a reverse path tree. In the following, we will use the term mobility routing as a common name for routing protocols developed for mobile adhoc networks.

As it turns out, there are nontrivial issues surrounding the simultaneous use of adhoc networks with Mobile IP. Mobile users would naturally expect that both should be useful together; a foreign agent attached to an adhoc network should provide Internet connectivity to every node in the adhoc network. On the other hand, manipulation of the route table by Mobile IP is not completely consistent with the way ad hoc routing protocols may wish to do route table management, i.e. not all mobile node routes are available for the Mobile IP agent at all times. Furthermore, the rules for Mobile IP need to be adjusted so that the agent advertisements can be delivered to every mobile node in the adhoc network across multiple router-hops. It is the intention of this invention to define a new way of combining mobile IP with mobility routing protocols in the sense that the mobility routing protocol is placed as an overlay rather than an access network to mobile IP.

If Mobile IP and adhoc routing are two sides of the same coin, the third aspect of this invention is often placed in stark opposition to mobility. Security solutions on the Internet, and more specifically the deployment of virtual private networks (VPNs), rely on a set of fixed associations maintained between clients and gateways as well as between gateways themselves. In a site-to-site VPN, a VPN gateway that is placed at the enterprise perimeter typically allows any VPN client with the correct IP address to send traffic from the inside of the intranet cloud out through a VPN tunnel to another intranet cloud. This essentially creates a larger intranet where all sites are open territory. This may sound nice from a mobility perspective, but is hardly encouraging from a corporate security perspective. Statistics tells that four out of five intrusions come from the inside. For this reason end-to-end application layer security are normally added to each client-server and peer-to-peer communication most often leading to a proliferation of pop-up windows on the client for entering user identities and passwords for every server and application that the user wants to access. An administrative nightmare that this invention is eliminating through the use of a regular, yet for the mobile user hidden, authentication. The user authentication combined with per packet filtering or more advanced firewall functionality is performed by a VPN gateway at each site of the VPN in order to provide robust security for the local portion of workgroup networks and their individual server resources.

When it comes to remote access to the VPN, typically three classes of users need connectivity into the enterprise network from the outside:

Anonymous users who normally access via the Internet,
External business partners who access through leased lines, and
Corporate users who need remote access to corporate resources.

Remote corporate users want to receive the same level and ease of access to corporate resources that they enjoy when they are physically located on the enterprise LAN. For this purpose, the VPN gateway applies strong user authentication and reconfiguration of a VPN client that tries to access the intranet from the outside. When inside, the VPN client can reach any and all resources on the intranet unless an application-based authentication is applied as described above for the site-to-site VPN case.

By contrast, Internet users should be able only to access the publicly available servers (e.g. web, mail and ftp). This is normally done by creating a DMZ (de-militarized zone) separate from the intranet, onto which selected resources are mirrored for accessibility from the Internet.

As for external business partners (i.e. extranets), depending on the business need, access is normally provided to an isolated sub-network or directly to a particular server on the intranet. If a business partner needs to roam into the site, i.e. physically work at the company's premises, a separation of the access and service network within the intranet is required. This is achieved in the following invention through the creation of an additional leg on the VPN gateway in very much the same manner as the DMZ was separated from the intranet for publicly available web resources.

In the following description, the term mobile VPN is used for a VPN in which the users are allowed to move around within the intranet, extranet and Internet without loosing their communication sessions, user privileges or security protections. The term mobile workgroup system will similarly be used to denote a subset of the mobile users and server resources in the mobile VPN that are grouped together based on organizational or security aspects to form a tightly knit community.

The following references are also of general interest for the understanding of the present invention:

Alexander, S. et al; DHCP Options and BOOTP Vendor Extensions; IETF RFC 2132; March 1997

Bellur, Bhargav et al; Topology Broadcast based on Reverse-Path Forwarding (TBRPF); IETF Internet Draft; July 2000

Calhoun, Pat et al; DIAMETER Base Protocol; IETF Internet Draft; September 2000

Calhoun, Pat et al; DIAMETER Mobile IP Extensions; IETF Internet Draft; September 2000

Calhoun, Pat et al; Mobile IP Network Access Identifier Extension for IPv4; IETF RFC2794March 2000

Corson S. et al; Mobile Ad hoc Networking (MANET) Routing Protocol Performance Issues and Evaluation Considerations; IETF RFC2501; January 1999

Droms, R.; Dynamic Host Configuration Protocol; IETF RFC2131; March 1997

Handley, M. et al; SIP: Session Initiation Protocol; IETF RFC2543; March 1999

Harkins, D. et al; The Internet Key Exchange (IKE); IETF RFC2409; November 1998

Hiller, Tom et al; 3GPP2 PR0001 v1.0.0/Wireless IP Network Architecture based on IETF protocols; July 2000

Hiller, Tom et al; 3GPP2 PS0001-A, v1.0.0/Wireless IP Network Standard; July 2000

Kent, S. et al; Security Architecture for the Internet Protocol; IETF RFC2401; November 1998

Kent, S. et al; IP Encapsulating Security Payload (ESP); IETF RFC2406; November 1998

Kent, S. et al; IP Authentication Header; IETF RFC2402; November 1998

Montenegro, G.; Reverse Tunneling for Mobile IP; IETF RFC2344; May 1998

Perkins, Charlie; IP Mobility Support; IETF RFC2002; October 1996

Perkins, Charlie et al; Ad hoc On-demand Distance Veector (AODV) Routing; IETF Internet Draft; July 2000

Sanchez, L. et al; Security Policy Protocol; IETF Internet Draft; July 2000

Veizades, J. et al; Service Location Protocol, Version 2; IETF RFC2608; June 1997

SUMMARY OF INVENTION

The invention defines a mobile virtual private network (VPN) providing a mobile client secure data access to the VPN and secure data access to the mobile client from within the mobile VPN, when the point of attachment of the mobile client to the mobile VPN is allowed to change.

FIG. 1 in the following detailed description shows the basic components in the mobile VPN 18, covering a number of sites 1a, 1b and 1c as well as subnetworks 2 within each of these sites. The system allows mobile users 14 to select server resources 28 and correspondent nodes 16 to access pending their workgroup 26 membership approvals. All workgroup 26 policy rules are defined in a mobile service manager 22 and pushed down to one or more mobile service routers 10 for policing.

The mobile user is authenticated at start and during the continuation of a network login session in order to verify that the IP address, to be used in firewall filters and route policies, is tied to the correct mobile user. The users within a mobile VPN can communicate using intra-domain, inter-domain or remote access routing. Intra-domain routing between participating nodes in a mobile VPN home network is based on flat (non-hierarchical), mobile adhoc network (MANET) routing techniques. Inter-domain routing is performed through encapsulation of intra-domain packets in a tunneling protocol between foreign and home mobile service router following a handshake via any number of AAA proxies.

BRIEF DESCRIPTION OF THE DRAWINGS

The foregoing and other objects, features, and advantages of the invention will be apparent from the following description of preferred example embodiments as well as illustrated in the accompanying drawings in which:

FIG. 16 is a flowchart diagram illustrating the mobile client runtime registration procedure in more detail for the mobile IP case.

While individual functional blocks and components are shown in many of the figures, those skilled in the art will appreciate these functions may be performed by software modules or programs executed using a suitably programmed digital microprocessor or general purpose computer by individual hardware circuits, by an application specific integrated circuit (ASIC), and/or by one or more digital signaling processors (DSPs).

DETAILED DESCRIPTION OF PREFERRED EMBODIMENTS

In the following description, for purposes of explanation and not limitation, specific details are set forth, such as particular embodiments, circuits, signal formats, techniques, etc. in order to provide a thorough understanding of the present invention. Although specific protocols are referred to for purposes of facilitating the description, the present invention is not necessarily limited to such specific protocols. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

The present invention provides a network-based mobile workgroup system based on a novel routing and security solution for mobile VPNs. It has considerably wider appeal and application than current virtual private networks in that it provides seamless mobility across a number of access technologies at the same time as it offers a granular security separation down to workgroup level.

Figure 1:
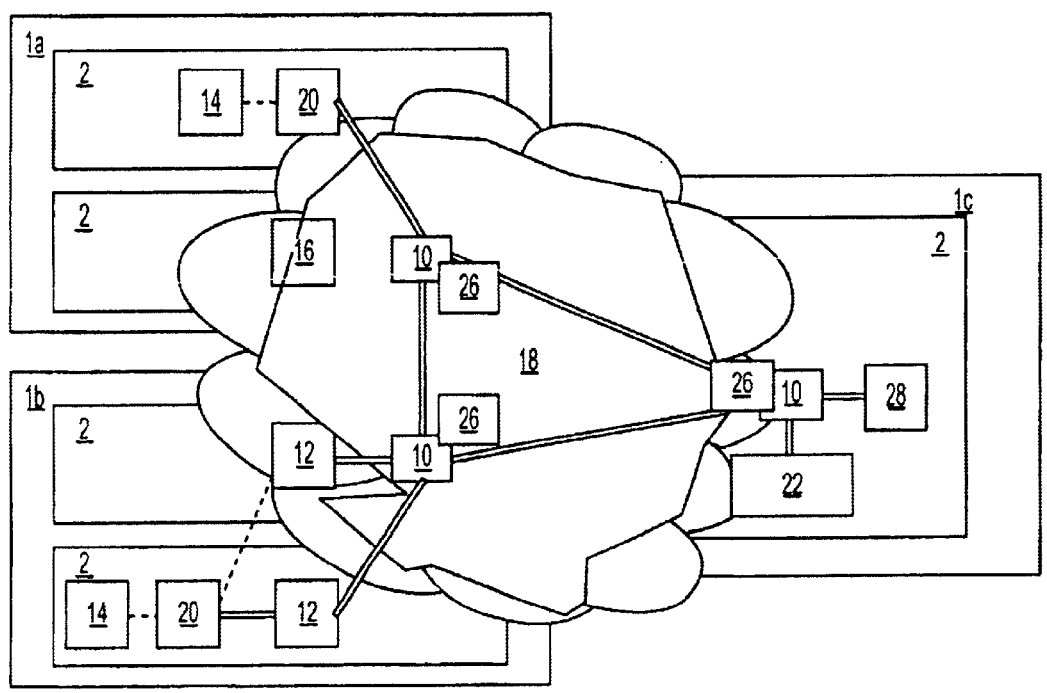
FIG. 1 is a function block diagram illustrating the basic components of a mobile workgroup system.

FIG. 1 shows the basic components in a network-based mobile workgroup system covering a number of sites 1a, 1b and 1c as well as subnetworks 2 within each of these sites. The mobile workgroup system shall be seen as an access management system for mobile users 14 with VPN and firewall functionality inbuilt. The mobile user 14 can access the mobile workgroup system over a set of access point 12 types, e.g. LAN, WLAN or Bluetooth. The mobile workgroup system allows mobile users 14 to select server resources 28 and correspondent nodes 16 to access pending their workgroup 26 membership approvals. All workgroup 28 policy rules are defined in a mobile service manager 22 and pushed down to one or more mobile service routers 10 for policing. The mobile service router 10 closest to the mobile client 20 and being part of the mobile virtual private network 18 performs regular authentication checks of the mobile client 20 during service execution. At the same time it performs traffic filtering based on the mobile user's 14 workgroup 26 memberships. Together, these two components constitute an unprecedented security function for a distributed workgroup 26 system in a mobile virtual private network 18.

Figure 2:
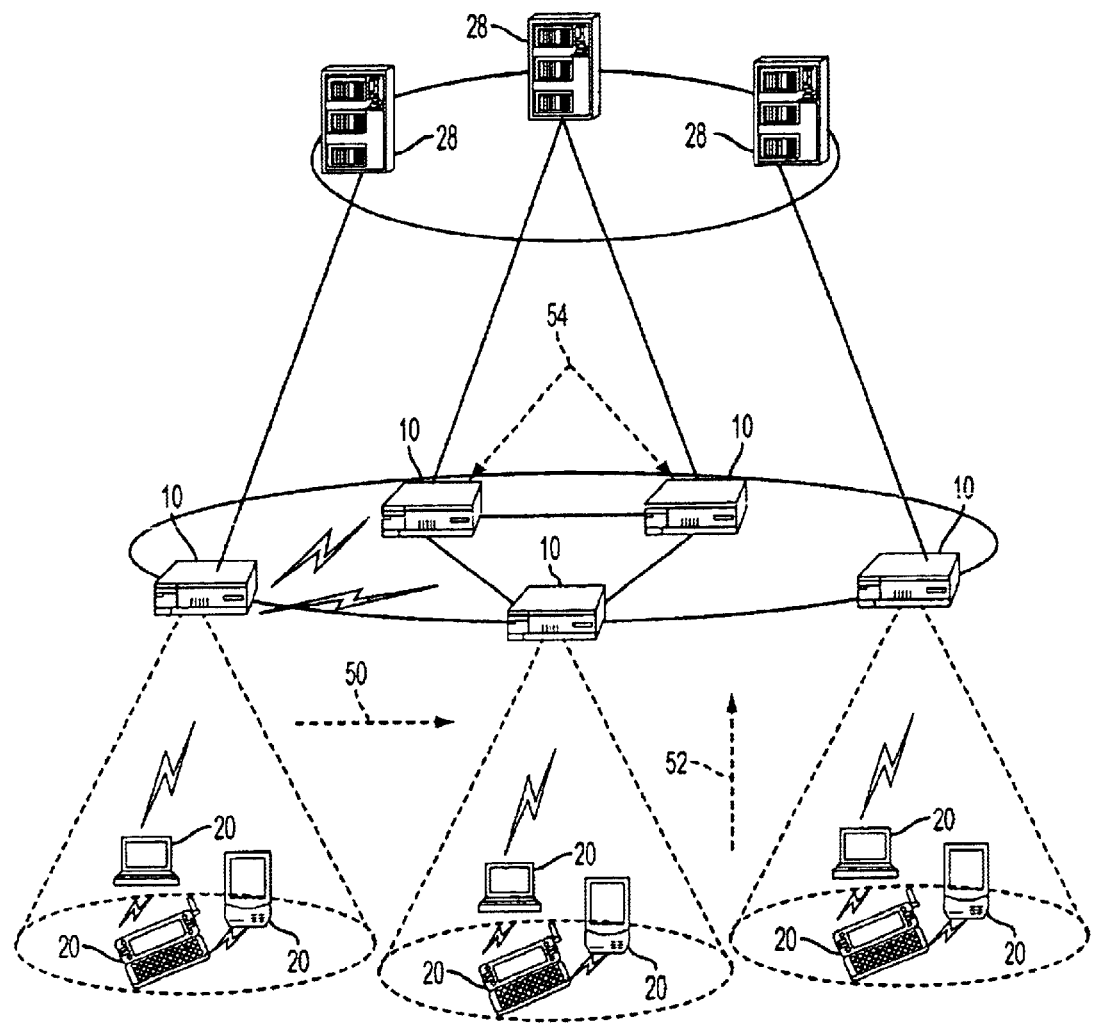
FIG. 2 is a function block diagram illustrating a generalized architecture for the mobile virtual private network.

FIG. 2 depicts a generalized architecture for the mobile virtual private network 18. Mobile VPN 18 is the name given to the dynamic and multi-hop network that can be created by mobile clients 20 with or without the presence of an infrastructure. In such an environment the mobile clients 20 and their associated mobile service routers 10 have to be prepared for frequent and non-predictable routing changes, asymmetric connections and a lack of configuration servers.

Mobility routing 50 is a mechanism by which mobile users 14 in a mobile VPN 18 can communicate. Mobility routing 50 relies on a new set of routing protocols that are reactive rather than proactive in nature. Current routing protocols, like the open shortest path first (OSPF) protocol and the routing information protocol (RIP), proactively update their routing tables for every connectivity change in the network. This creates a lot of overhead in dynamic environments such as in the area of personal mobility where headsets, cellular phones, PDAs and laptops are communicating over WLAN, Bluetooth or a mix of both. Reactive routing protocols, on the other hand, establish routes only when needed. The established routes are maintained and repaired as long as they are in use. When not used, their states fade out and subsequent routing changes are ignored. In the case that one of the links in the network breaks, a forced handoff is initiated at the routing layer. If there is no alternative route, partitioning of the mobile VPN 18 domain Is initiated as an inherent part of the mobility routing protocol. If the lost link later emerge, the partitioned parts of the mobile VPN 18 are automatically joined again at the routing layer. Mobility routing 50 is the first cornerstone of the mobile VPN 18.

Similarly, the mobile client 20 configuration needs to be modified for the mobile VPN 18 to work. In the current Internet, dynamic configuration of clients is done at login by the use of DHCP and PPP network servers. But what if the mobile client cannot reach a configuration server? In the mobile VPN 18, self-configuration 52 is activated as needed. Self-configuration 52 in the mobile VPN 18 is requires zero-configuration of the mobile client 20 when registering with the network. Self-configuration is based on the use of service location protocols between mobile client 20 and the mobile service router 10 to discover local resources. More specifically, the workgroup service profile that is downloaded from the mobile service manager 22 to each mobile service router 10, may contain wildcards, effectively pointing out peer-servers from which the mobile service router 10 is ordered to discover local server resources 28. Self-configuration 52 is the second cornerstone of the mobile VPN 18.

Last, physical firewalls are of little help in an adhoc networking environment. Physical firewalls require a stable physical infrastructure and tunneling to a home network to be secure. In an adhoc environment not only the mobile clients 20, but also the connectivity over which they communicate come and go during the lifetime of the workgroup. Therefore, in a mobile adhoc environment the security rules need to be distributed to all members of the workgroup 26, creating a virtual rather than a physical firewall around the communicating group. The virtual firewall 54 is the third cornerstone of the mobile VPN 18.

Figure 3:
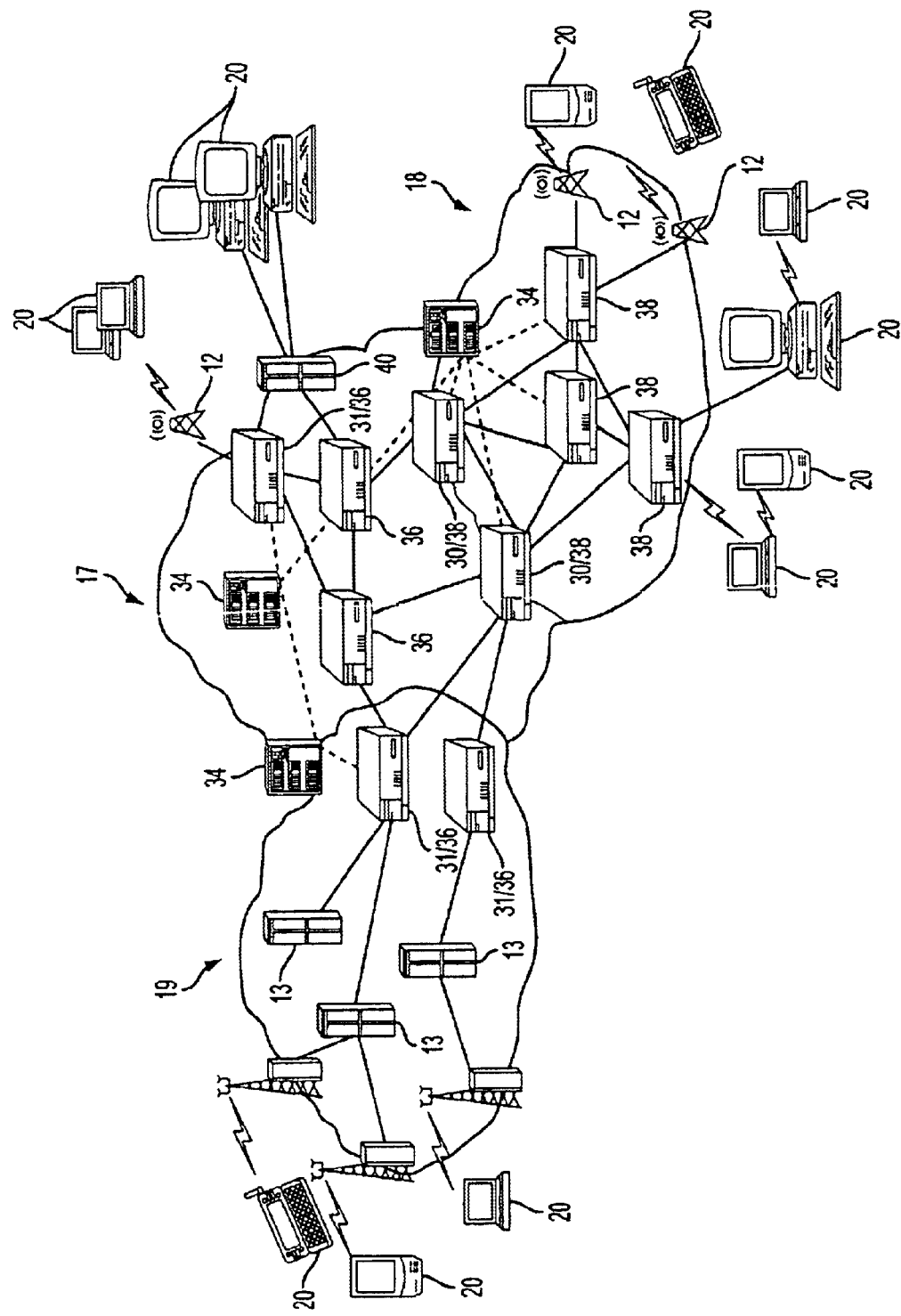
FIG. 3 is a function block diagram illustrating a mobile Internet reference architecture in which the present invention may be advantageously deployed.

FIG. 3 presents the reference architecture for the Mobile Internet as a basis for presenting the different inter-domain and remote access options to the mobile VPN. At the lower right, the mobile VPN is described. All mobile service routers 10 equipped with mobility routing 50 protocols are denoted mobility routers 38. Some of the mobile service routers in the mobile VPN 18 are equipped with mobile IP home agent 30 functionality for the purpose of inter-domain routing. Some routers 36 in the Internet 17 and 3G networks 19 can act as foreign agents 31 for mobile clients 20, allowing the mobile user 14 to keep his service running while changing point of attachment, i.e. radio network 13, or WLAN access point 12. In addition, the mobile client 20 can roam into Internet 17 subnets that do not have a foreign agent 31 functionality, exemplified by the remote access server (RAS) 40 in FIG. 3. In this case, the mobile user 14 will utilize a co-located care-of address inside the mobile client 20 to access the mobile VPN 18. The mobile client 20 will be configured with a well-known (fully qualified) DNS name for the workgroup remote access. The IP addresses of several mobile service routers 10 may be received in a DNS query and the mobile client will try them in the order received. The traffic from the co-located care-of address is tunneled back to the selected mobile service router 10 with home agent 30 functionality for the mobile VPN 18. The communication is authenticated using the mobile IP/AAA protocols and it is encrypted/authenticated using the IPSec protocol. As there may be other security gateways along the path between the mobile client 20 and mobile service router 10, the mobile client may initiate a security gateway discovery using the security policy protocol (SPP).

Figure 4:
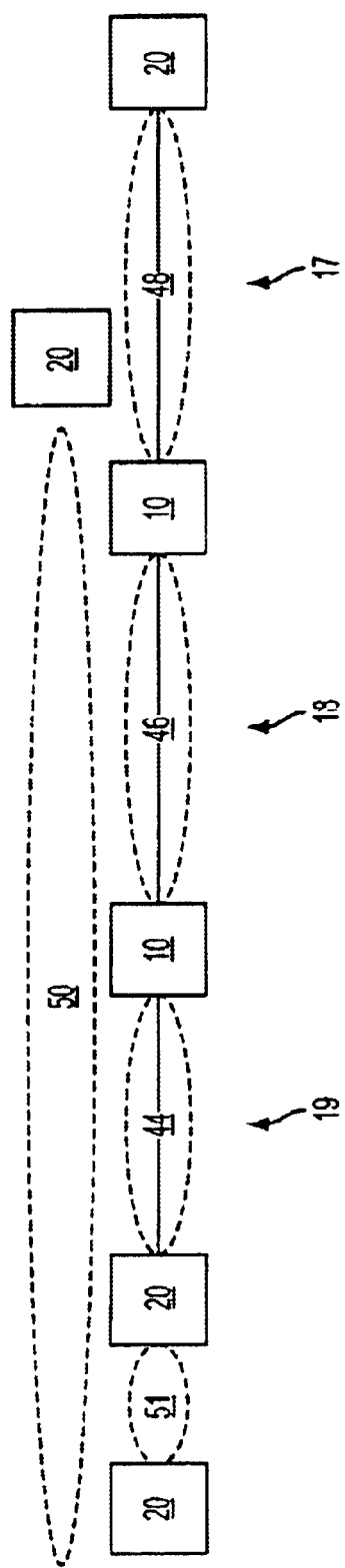
FIG. 4 illustrates a protocol model for the mobile workgroup system as applied in the mobile Internet reference architecture.

Assume a mobile VPN cloud 18 of mobile clients 20 that communicate with a fixed infrastructure of mobile service routers (MSRs) 10 as depicted in FIG. 4. The MSRs 10 can communicate directly with each other and the mobile clients 20 via the Internet 17, Mobile IP 44 and Bluetooth-based personal area networks (PAN) 51. The MSRs 10 and clients 20 form an overlay mobility routing 50 network on top of the others. Each MSR 10 also hosts fixed resources (e.g. servers 28) for which ordinary Intranet routing protocols (e.g. OSPF) 46 are applied. Each mobile client 20 keeps one of the MSRs 10 as its current 'anchor' and all non-PAN internal communication from/to the mobile client 20 goes through this MSR 10. The mobile clients 20 move around and can change to which MSR 10 they are connected/anchored. The other correspondent nodes 16, that the mobile clients communicate with outside of this particular mobile VPN cloud, do not need to be concerned with where the mobile client 20 are attached/located at any particular point in time. From the outside, the whole mobile VPN cloud 18 looks like an ordinary routing entity. This routing entity may be multi-homed, in which case multiple MSRs 10 publish routes for the mobile clients 20 through ordinary Internet routing protocols (BGP) 48. The mobility routing 50 protocol in the mobile VPN 18 allows for each MSR 10 to be able to handle packets destined for any of the mobile clients 20 and forward them correctly. The client's MSR 10 can handle the packets that are sent from the mobile client 20, just by using ordinary Internet routing 48 for external correspondent nodes 16 or by using mobility routing 50 as above towards other mobile clients 20 inside the mobile VPN 18. Furthermore, the client's MSR 10 can use the mobility routing protocol 50 to advertise a limited set of routes to the mobile client 20 for which it can route traffic. The mobile client 20 will then use its default route to the local routing infrastructure for other traffic essentially performing selective reverse tunneling.

An extension of this definition of mobility routing 50 is to allow the mobile clients 20 to form workgroups 26 in the form of virtual overlay networks among some subset of them. In the case of a workgroup conference session, the MSRs 10 will forward packets destined to one of the workgroups 26 as if all of the workgroup members shall receive the packets. This is performed using a groupcast (also called xcast) or multicast protocol. The difference being that the source in a groupcast protocol has knowledge of all receivers, whereas this is not true in multicast protocols. Current Internet routing protocols normally uses Dijkstra's algorithm to find the shortest path to the destination. This works well for unicast protocols, but will render non-optimal selection in the case of multicast routing protocols. The current invention uses a branch and cut algorithm as an alternative for solving the Steiner tree problem that multicast routing is. The branch and cut algorithm will take into account all combinations of possible branch points in order to optimize for the overall lowest cost to all destinations in the multicast tree, whereas Dijkstra's algorithm will optimize for the shortest path for each individual destination only.

Another extension of this definition of mobility routing 50 is to allow the mobile clients 20 to themselves act as mobility routers 38 for wearable computing devices. This extends the routing protocol by allowing multiple hops from the end mobile client 20 to the first MSR 10.

Figure 5:
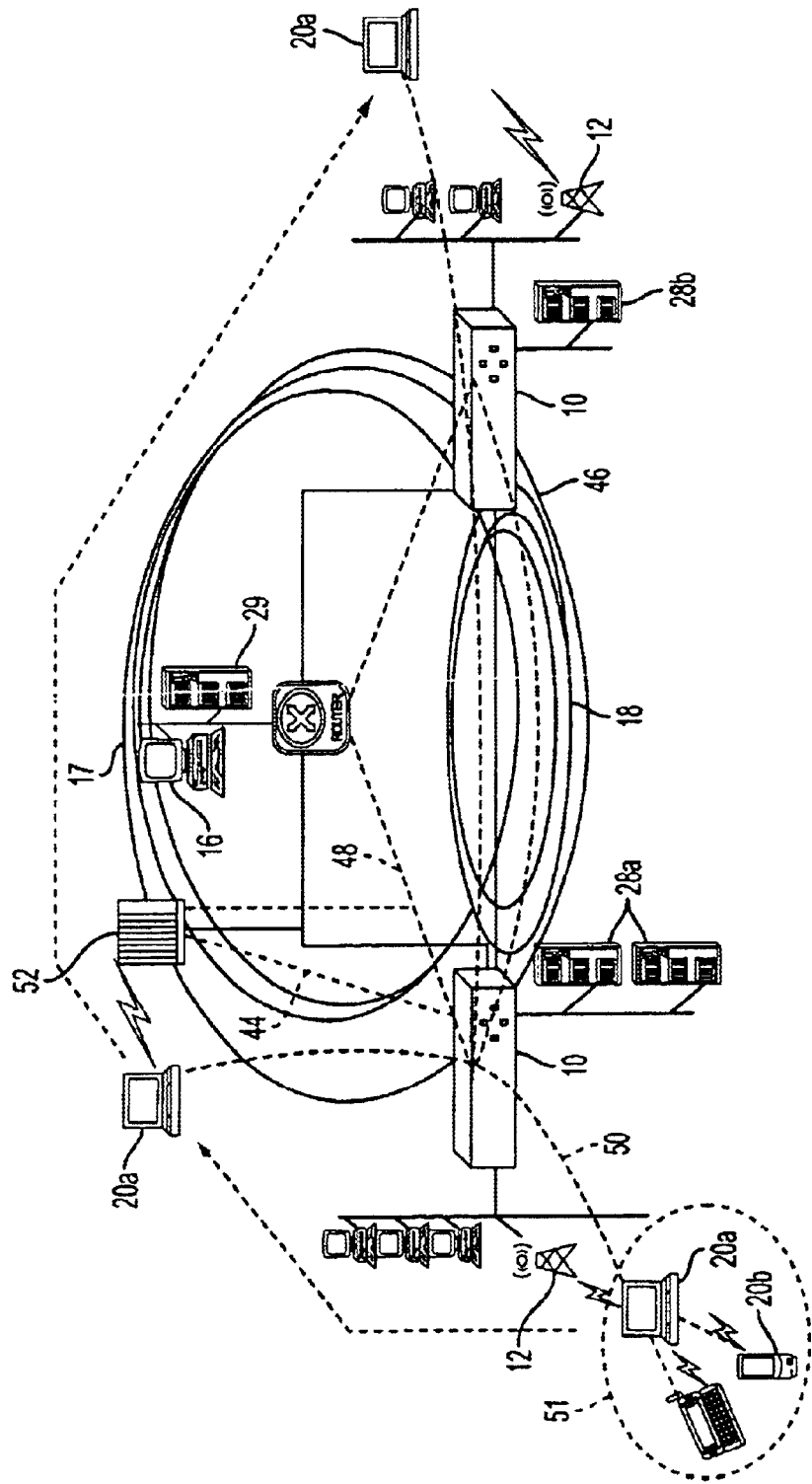
FIG. 5 is a function block diagram illustrating route propagation in the mobile workgroup system.

FIG. 5 shows the route propagation model for the mobile workgroup system and in particular for the mobility routing protocol 50 in relation to other routing protocols in the mobile VPN 18 and the Internet 17. The border gateway protocol (BGP) 48 is applied as the inter-domain routing protocol towards the Internet 17. The BGP 48 protocol allows the mobile clients 20a and 20b to access Internet servers 29 and be accessed by correspondent nodes (CN) 16 situated on the Internet 17. From the viewpoint of the Internet 17, the mobile VPN 18 is multi-homed via two mobile service routers 10. For the outgoing traffic case, the mobile clients 20a and 20b will select the mobile service router 10 providing the overall shortest path from itself to the Internet server 29. The cost for the Internet 17 path is propagated from BGP 48 into the mobility routing protocol 50. For the incoming traffic case, all mobile service routers 10 will publish an aggregate route for all mobile clients 20a and 20b towards the Internet with the same cost. The usage of an equal cost on the aggregate route to the Internet 17 ensures that no mobile client 20 specific routes are advertised in the Internet 17. Packets from a correspondent node 16 will be routed towards the mobile client 20 with the least number of autonomous system hops within the Internet 17, i.e. towards the closest mobile service router 10.

An intra-domain routing protocol, like OSPF 46, may be advertising routes for stationary systems like the mobile service routers 10 themselves and the Intranet servers 28a and b hosted within the mobile VPN 18. The propagation of routes between OSPF 46 and the mobility routing protocol 50 takes into account costs that have been gathered in both protocols thus ensuring optimal routing (avoiding tromboning between mobile service routers 10) when the mobile client 20 is accessing intranet server resources 28a at a local site.

Figure 6:
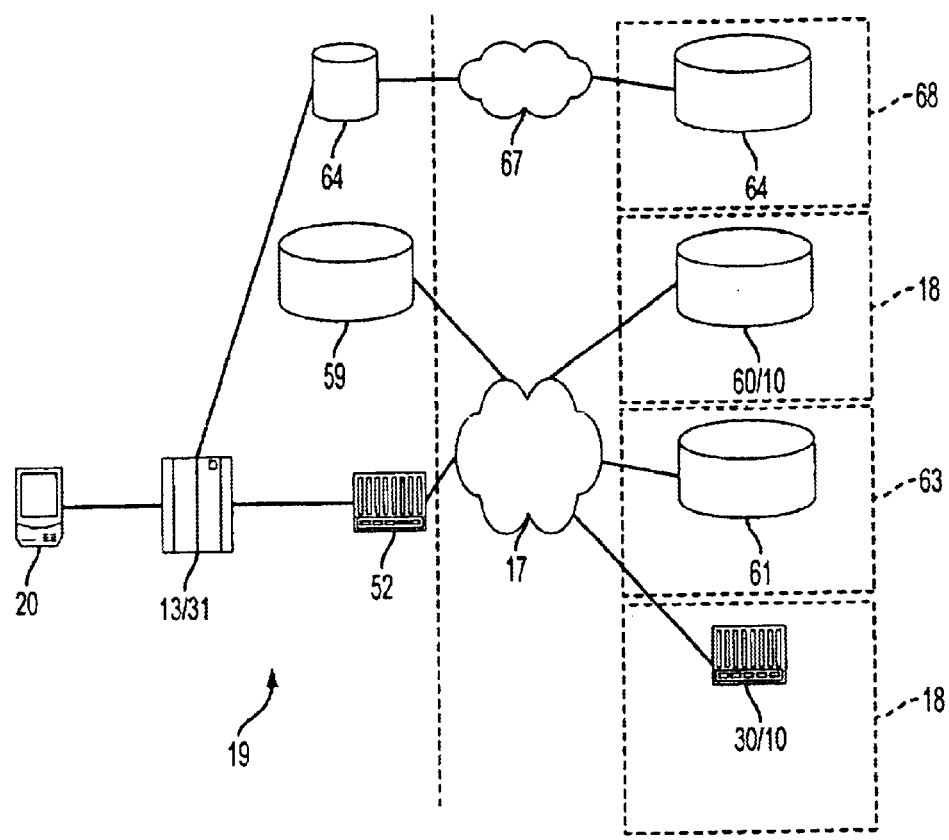
FIG. 6 is a function block diagram illustrating a $3^{rd}$ generation packet core network architecture based on the cdma2000 standard.

FIG. 6 shows the separation of link layer access 19 and mobile VPN 18 in a $3^{rd}$ generation packet core network architecture based on cdma2000. The link layer access is controlled by an infrastructure involving a Visiting Location Register 64 and a Home Location Register 62 in the home access provider domain 68. The Visiting Location Register 64 and Home Location Register 62 are interconnected by a signaling system number 7 network 67. In FIG. 6, the mobile service router 10 integrates a DIAMETER server 60 and a home agent 30 for the purpose of authenticating the mobile VPN 18 access. All mobile service routers 10 in the mobile VPN 18 are possible destinations (IP addresses) to act as a DIAMETER server 60 and are therefore registered in the Internet domain name system (DNS).

The packet data service node (PDSN) 52 in the cdma2000 network acts as the foreign agent 31. The PDSN 52 also contains a DIAMETER client, and initiates a DIAMETER request via its local DIAMETER server 59 in the visited access network 19 towards the DIAMETER server 60 of the home domain 18 where the mobile client 20 belongs. The DIAMETER protocol utilizes the DNS to nest up the path to the DIAMETER server 60. This may involve hops across DIAMETER brokers 61 in broker networks 63. The following invention stipulates that the last DIAMETER broker 61 before reaching the DIAMETER server 60 will select the IP address with the lowest routing cost from the list received in the DNS reply. In IPv6, the use of a set of IP addresses tied to one DIAMETER server 60 name, may be replaced by a well-known anycast IP address that all "home" mobile service routers 10 will respond to. The first one answering the DIAMETER query 60, will then become the DIAMETER server 60. As a third alternative presented in this invention for the selection of "home" mobile service router 10 acting as DIAMETER server 60, the mobile client 20 may use a spatial location protocol to determine the geographic position of itself and the available mobile service routers 10. The mobile client 10 will then select the mobile service router 1O, which is in closest geographic vicinity as its DIAMETER server 60. The mobile service router 10 acting as DIAMETER server 60 may in turn select another mobile service router 10 to act as home agent 30 in accordance with the DIAMETER standard.

Figure 7:
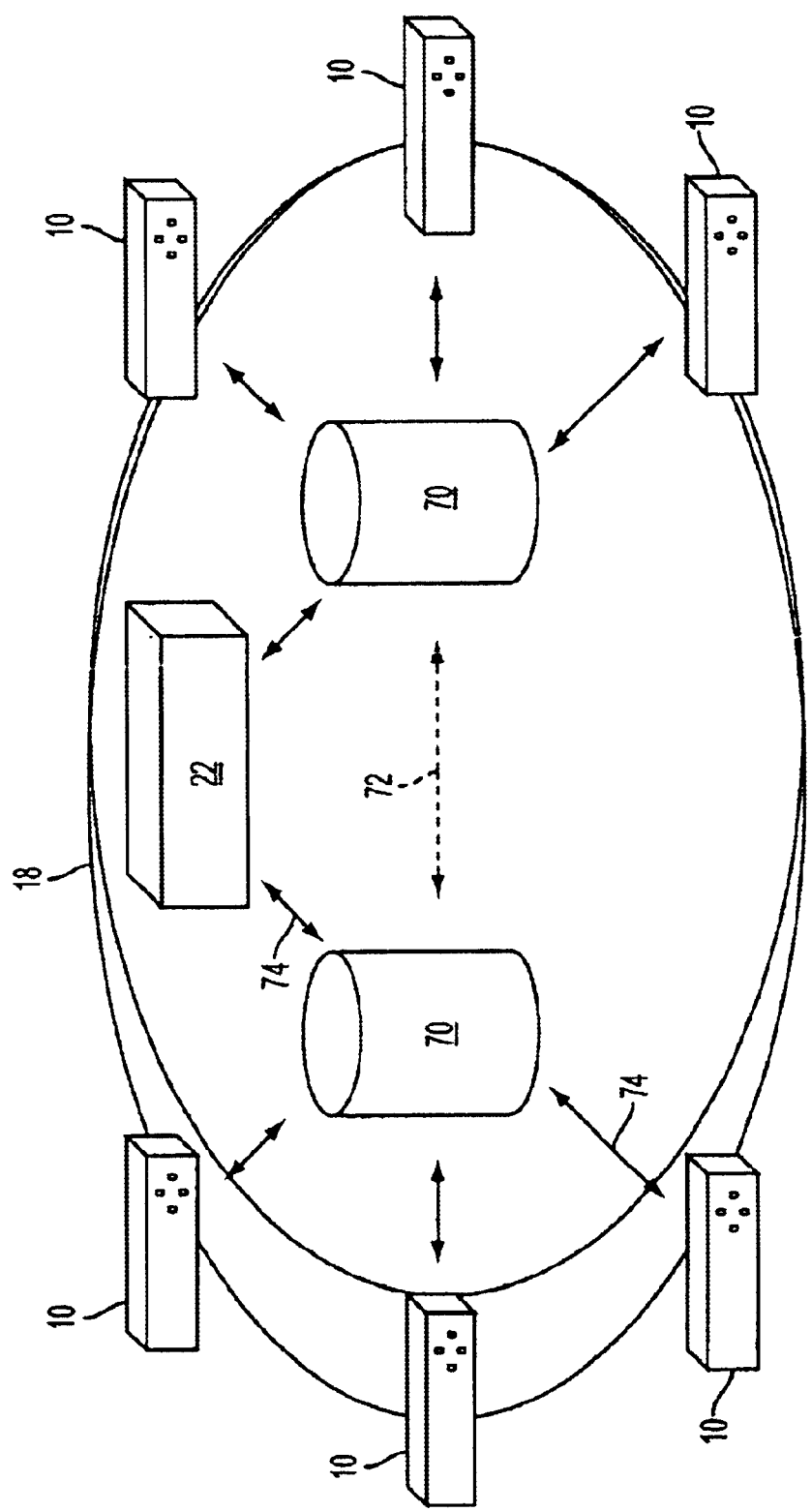
FIG. 7 is a function block diagram illustrating a distributed implementation of a DIAMETER server.

FIG. 7 illustrates the implementation of the distributed DIAMETER server 60. The DIAMETER protocol termination is executed in any of the mobile service routers 10 in the mobile VPN 18, while the data storage 70 is centralized to a redundant pair of LDAP servers acting as storage areas 70. Data replication 72 is performed between the two data storage areas 70. The mobile service manager 22 uses the same data storage 70 for the purpose of distributing service configuration data to the mobile VPN 18 and its mobile service routers 10. LDAP 74 is used as the distribution protocol between the data storage area 70 and the mobile service routers 10.

Figure 8:
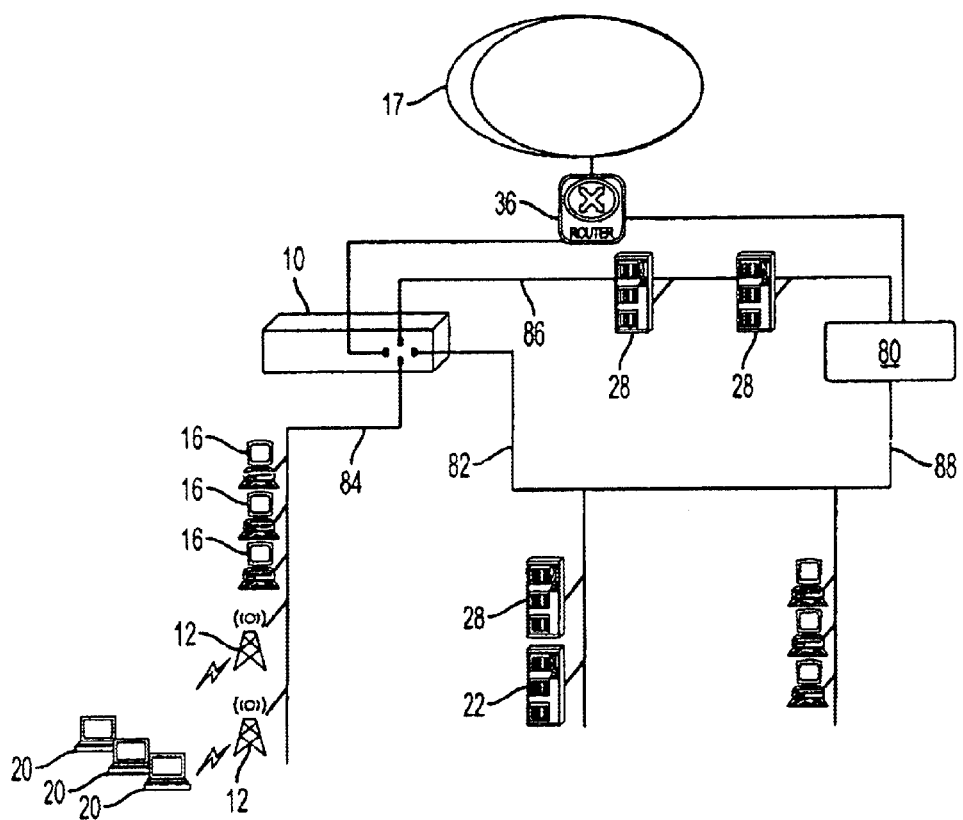
FIG. 8 is a function block diagram illustrating the placement of a mobile service router in a corporate site.
Figure 9:
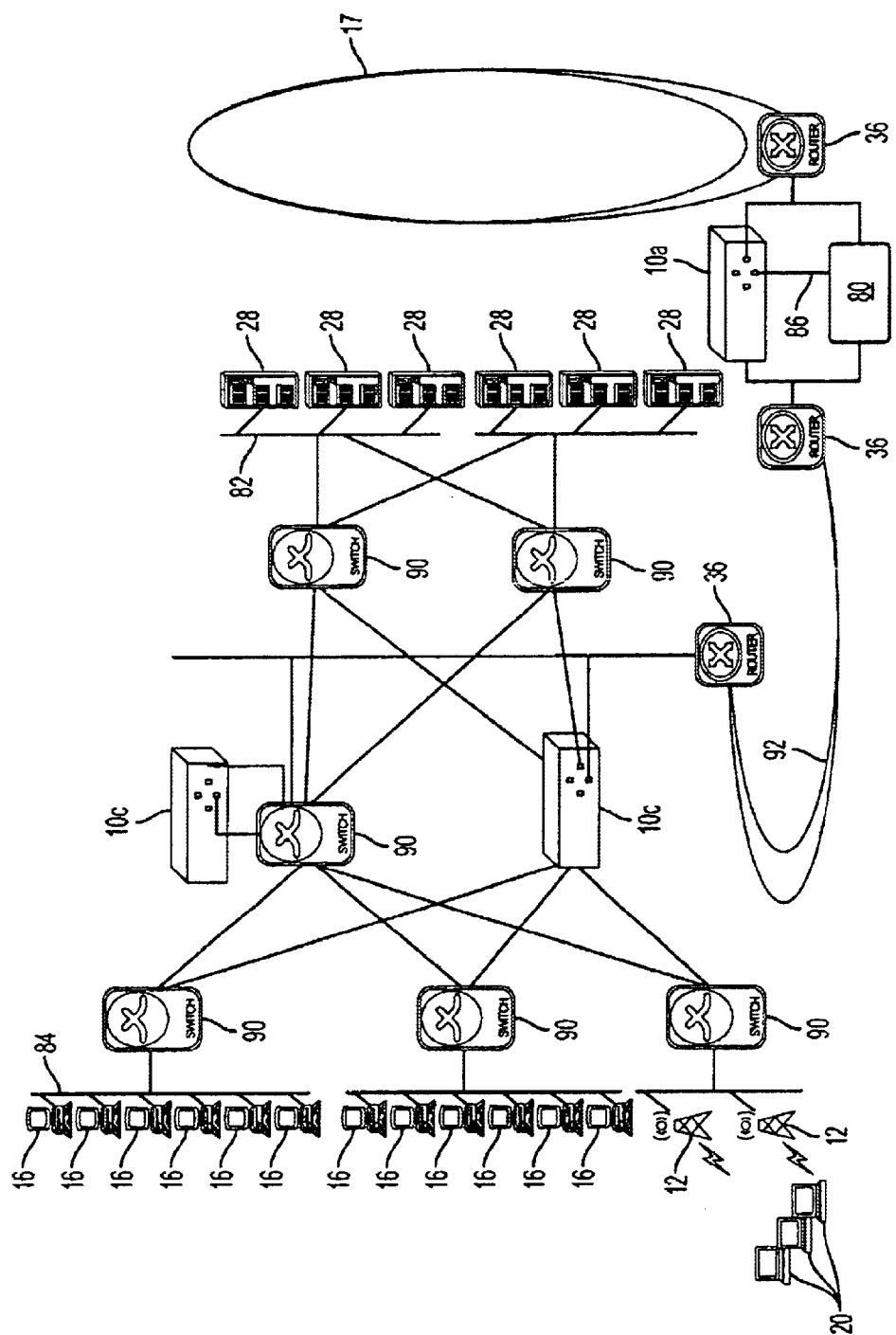
FIG. 9 is a function block diagram illustrating an example configuration of a mobile workgroup system for a corporate network with large sites.

FIGS. 8 and 9 illustrate the placement of the mobile service router 10 in a small and a large mobile VPN 18 site respectively. In FIG. 8, the mobile service router 10 is placed in parallel with an existing firewall 80. The mobile service router 10 is equipped with four interfaces towards the Internet 17, ServiceNet 82, AccessNet 84 and DMZ 86 respectively. The ServiceNet 82 is physically the same network as the regular Intranet 88 being protected by the firewall 80. The AccessNet 84 is physically separate and unprotected in the sense that it provides wired and wireless access to corporate users, partners and guests. The mobile service router 10 applies user authentication and packet filtering on traffic from the AccessNet 84. Certain users, like the guests users, may only have access to the DMZ 86 and the Internet 17. The access rights are determined by the workgroup membership that the mobile service router 10 receives from the mobile service manager 22 when the guest is registered at the reception desk.

Multiple mobile service routers 10 will be installed in a large corporate site as shown in FIG. 9. The mobile service router 10 can be seen as an add-on installation or a replacement for the middle layer of Ethernet switches 90 between the AccessNet 84 and the ServiceNet 82. The mobile service router 10a acts as the local router for the mobile clients 20 that are currently connecting to the AccessNet 84. Instead of being tunneled back to their individual home networks, the local mobile service router 10c can detect and propagate the mobile client 20 route to correspondent nodes 16 using a mobility routing protocol 50. The mobile service router 10c also act as a service discovery 52 and a workgroup filtering 54 function for the mobile client 20 when it comes to accessing the local server farm 28 on the ServiceNet 82. An internal backbone 92 may connect several corporate sites together by using regular routers 36. One or more sites may act as border gateways towards the Internet 17. At such a site, the mobile service router 10a will also be equipped with mobile IP 44 home agent 30 functionality in order to terminate the tunnel for remote mobile clients 20 accessing the mobile VPN 18 via the Internet 17. Similarly, the mobile service router 10a may act as the mobile IP 44 foreign agent 31 for mobile clients 20 visiting the mobile VPN 18. As the mobile service router 10c secures the server farm on the ServiceNet 82, selective reverse tunneling can be allowed so that a visiting mobile client 20 may use mobile IP 44 via the mobile service router 10b for accessing information on its home network on the other side of the Internet 17, while it can also access the local server resources on the ServiceNet 82 via direct mobility routing 50 at mobile service router 10c.

Figure 10:
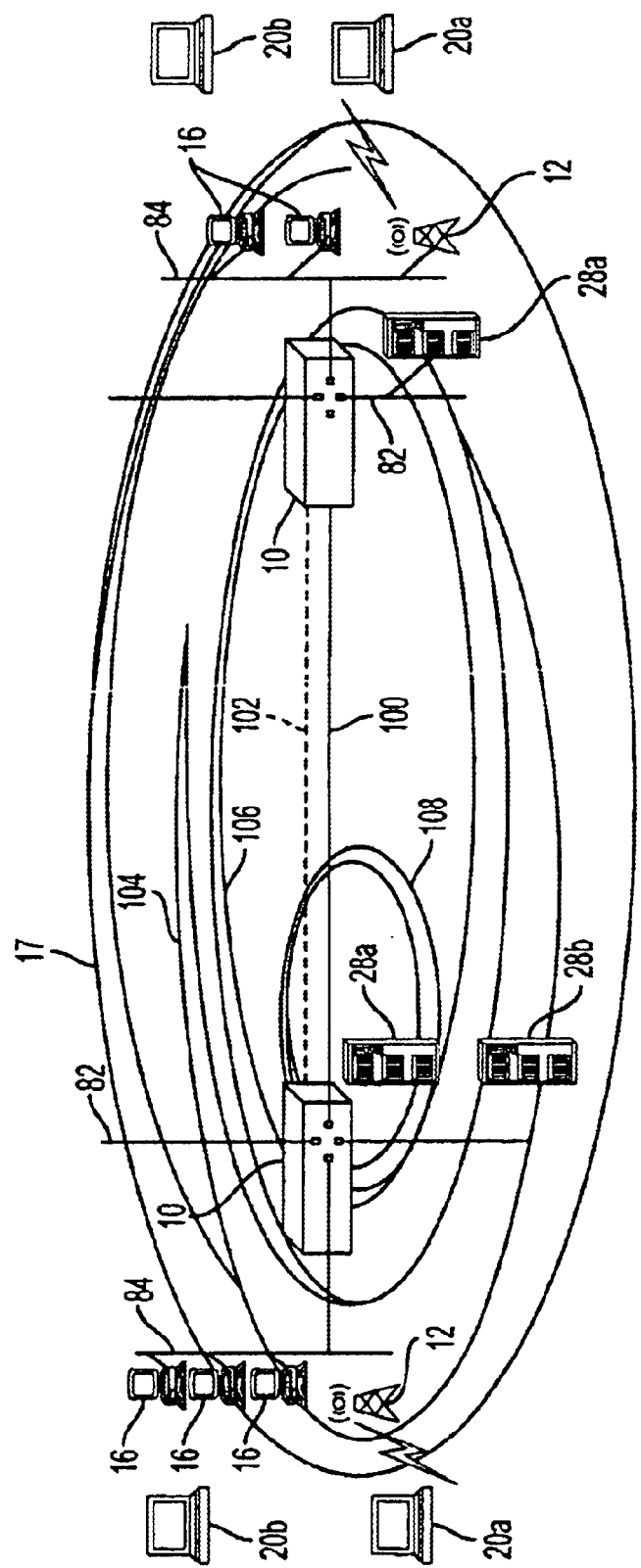
FIG. 10 is a function block diagram showing a layered security model for the mobile workgroup system.

FIG. 10 shows the security architecture for the mobile workgroup system. The mobile workgroup system includes several levels of security; MVPN Tier 104, WG Network Tier 106, and ServiceNet Tier 108. The MVPN Tier is introduced in order to apply encryption for the communication between the two mobile service routers 10 at each site. The WG Network Tier 106 is created in order to limit mobile user 14 privileges by introducing roles. The ServiceNet Tier 108 is introduced in order to limit mobile user 14 movability by separating the ServiceNet 82 from the AccessNet 84. The ServiceNet 84 may in addition be segmented into virtual local area networks (VLAN) in order to protect individual application servers 28. All important applications will then run on separate servers 28a and 28b, which may optionally be firewall protected by the mobile service router 10 closest to the server resource 28.

The following applies for the MVPN Tier 104. The MVPN Tier 104 protects VPN traffic, such as mobile IP, DNS and routing updates, from attacks. Its network scope includes MVPN tunnels 100 between Sites (mobile service routers 10) as well as the generic AccessNet 84 and ServiceNet 82 at all sites of the mobile VPN 18. The entry barrier to the MVPN Tier 104 is a one-way network address translation (NAT) gateway for Internet traffic and an IPSec-based MVPN tunnel 100 limited to certain protocols (e.g. mobile IP, DNS and OSPF) and ingress interfaces (mobile client 20 home networks). In case the administration is separated for the two sites, a shared responsibility between site owners exist for creating the encrypted MVPN tunnels 100 as well as to define the set of protocols applied across the MVPN tunnels 100 and the static routes to be configured for reachability purposes. The responsibility to install an Internet gateway is delegated to each site owner.

The correspondent rules for the workgroup (WG) Network Tier 106 are as follows. The WG Network Tier 106 protects the workgroup peer-to-peer and client-server traffic from attacks. Its network scope encompasses logical WG Tunnels 102 between the sites (mobile service routers 10), as well as VLAN-restricted workgroup ServiceNets 82 at all sites. In order to enter the WG Network Tier 106, the mobile client 20 is required to go through a user authentication by the mobile service router 10 acting as the home agent 30 for the mobile client 20 as well as a per packet workgroup filtering (source and destination address, etc.) at the same mobile service router 10. In addition, the mobile service router 10 may optionally require that the communication with the mobile client 20 be encrypted. Administration is delegated to each home network owner when it comes to authenticating mobile clients 20, to perform per packet filtering based on shared workgroup service filter restrictions 54, and to apply optional encryption for a mobile client 20 accessing the WG Network Tier 106. The combination of mobile IP 44 user authentication and per packet filtering in the same "home" mobile service router 10 make it possible to perform dynamic IP address allocation to mobile clients 20 during the initial registration and still load the workgroup filter 54 with the correct mobile client IP 20 address mapping. The IP addresses for the workgroup servers 28 (destinations) are stable as are the range from which the peers get their IP addresses (other mobile clients 20 and correspondent nodes 16c). These addresses can be pre-configured in the workgroup filters 54.

The ServiceNet Tier 108 protects workgroup servers 28 against attacks and separates specific workgroup applications from each other. The network scope consists of VLAN-restricted workgroup ServiceNet 28a and 28b at each site. The entry criteria is controlled by a per packet filtering based on local application restrictions and optional end-to-end secure socket layer (SSL) or similar cryptographic functions. It is purely the responsibility of the resource owning party to apply the ServiceNet Tier 108. The ServiceNet Tier 108 is typically the place to protect individual folders and directories on servers 28 and perform application proxying to protect against virus.

Figure 11:
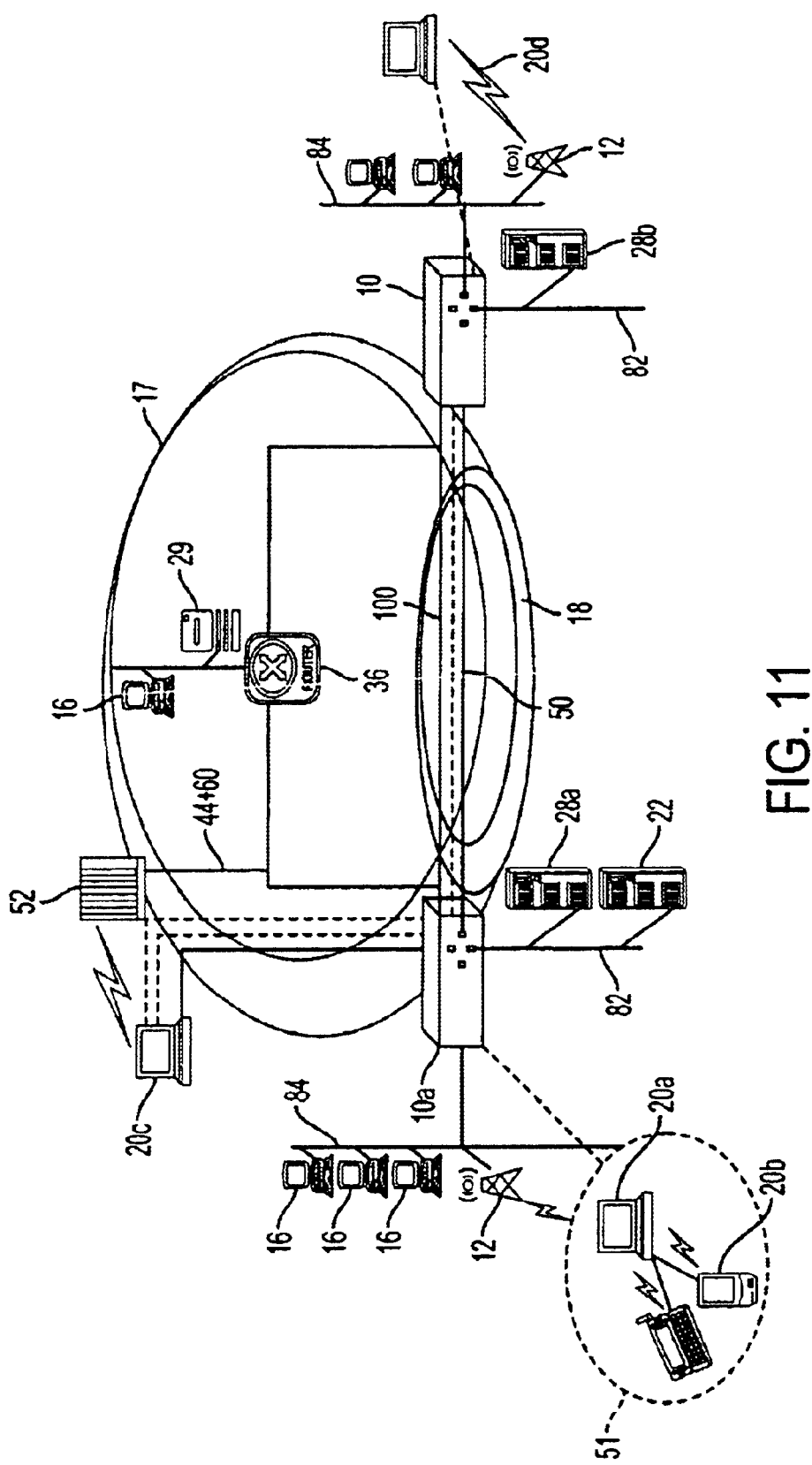
FIG. 11 is a function block diagram illustrating the set of security associations in the mobile workgroup system.

FIG. 11 illustrates the security associations that are utilized in the mobile workgroup system. All mobile clients 20 and mobile service routers 10, belonging to the same mobile VPN 18, share a security association in order to create a trusted network for route advertisements in the mobility routing protocol 50. The mobile service routers 10 also share security associations for establishing IPSec-based MVPN tunnels 100 between each site. For remote mobile clients 20c, the "home" mobile service router 10a holds a security association for mobile IP 44 and DIAMETER 60 authentication as well as for IPSec-based payload tunneling 100.

Figure 12:
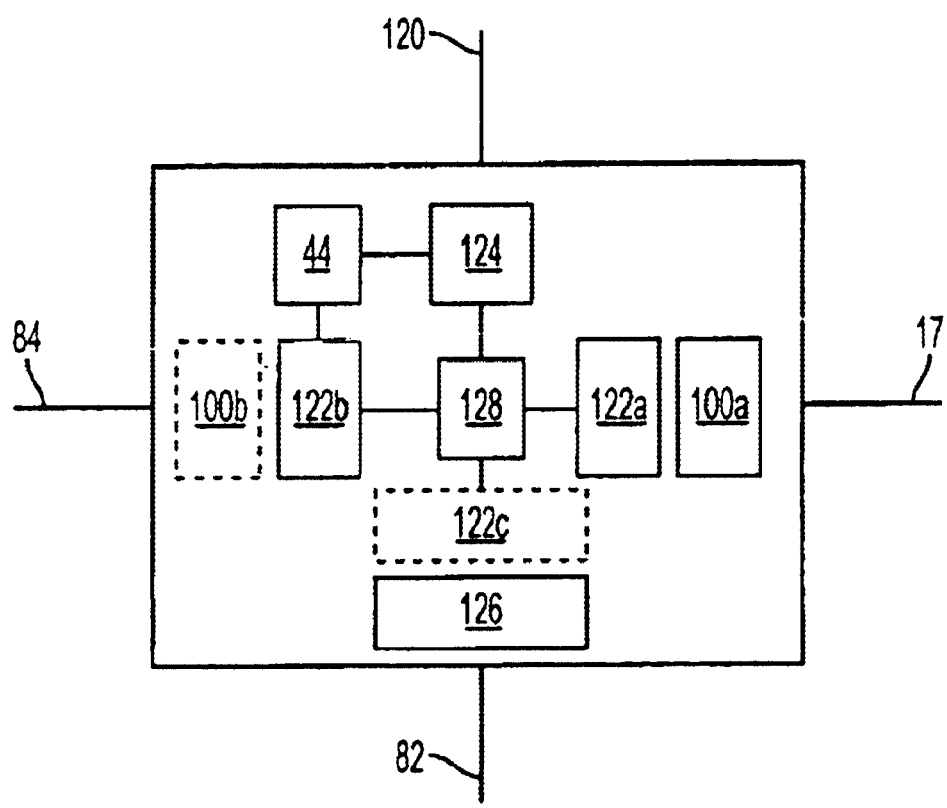
FIG. 12 is a function block diagram illustrating the security functions in a mobile service router.

FIG. 12 shows the security functions in a mobile service router. The IPSec component 100a is performing per packet authentication (AH) and/or encryption (ESP) for the traffic crossing the MVPN tunnel 100 between two mobile service routers 100. The firewall 122a restricts the traffic that can traverse the MVPN tunnel 100 by performing per protocol filtering at ingress and egress of the tunnel. The protocol filtering minimizes the target for attacks on the MVPN tunnel 100. In addition, the firewall 122a scans incoming Internet 17 traffic by comparing with established thresholds in order to provide early alerts to the mobile VPN 18 administrator of any denial-of-service (DoS) attacks. Such DoS attack protection is performed as close to the attacker as possible, i.e. at the mobile VPN 18 border.

The routing engine 128 maintains static and dynamic routes for workgroup members (20 and 16) and resources (28). The routing engine 128 publishes those routes to other mobile service routers 10 and regular routers 36. The domain name system (DNS) 124 is responsible to keep up to date resource records (RRs) for workgroup members (20 and 16) and workgroup resources (28). The resource records in the dynamic DNS 124 are updated by the mobile IP (MIP) function 44 when a mobile client is authenticated by a name and allocated a new IP address. At the same time, the dynamic workgroup filter 122*b* is updated with the IP address of the mobile client 20. The regular, yet hidden, mobile IP 44 user authentication in combination with the dynamic workgroup filter 122*b*, provides a strong lock to the WG Network Tier 106. The mobile IP 44 user authentication ensures that the correct mobile user 14 is utilizing the allocated mobile client 20 home IP address. The dynamic workgroup filter 122*b* applies the correct workgroup filters 54 to the mobile client 20 home IP address. As the mobile workgroup system is applying a per packet ingress filtering restriction based on workgroup member profile 122*b*, there is a small security risk induced by sharing the same DNS 124 and routing engine 128 for the whole mobile VPN 18. This means that a non-workgroup user can retrieve resource records for workgroup members (20 and 16) and resources (28), but any packets that are sent to those destinations may be ingress filtered by the firewall 122*b* at the entry point to the WG Network Tier 106. This simplification avoids the complexity of having an IPSec tunnel for each workgroup between the mobile service routers 10 and is the reason why the WG tunnel 102 is denoted logical only.

The home network for a mobile client 20 is best selected as being the ServiceNet 82 or being a virtual home network hosted by a mobile service router 10. Such a selection will require any mobile client 20 that is accessing the WG Network Tier 106 from an insecure AccessNet 84 (e.g. a WLAN), to go through a mobile IP 44 authentication, In principle all access attempts to the Workgroup Network Tier 100 are treated like remote access attempts. Any changes of MAC address will require a mobile IP 44 re-registration. As it is the "home" mobile service router 10*a* that acts as ARP proxy on behalf of the mobile client 20 on the home network, the mobile client 20 will not receive any proxy ARPs from a malicious client machine. Furthermore, the workgroup ingress filtering rule 122*b* for the mobile client 20 will not be activated until mobile IP 44 authentication has been performed. This means that a malicious access to workgroup service resources 28 is highly unlikely. However, because of the insecure nature of the AccessNet 84, other clients on the same access network may believe in the proxy ARP from the malicious client machine and send traffic destined to the mobile client 20 to the malicious client machine instead. In order to prevent such usage of the AccessNet 84, IPSec encryption 100*b* may be utilized between the mobile client 20 and the mobile service router 10, in which case the AccessNet 84 topology is changed from a broadcast-based Ethernet network to a star-shaped IPSec network.

The ServiceNet 82 may optionally be protected by a local firewall 122*c*, which perform application proxying as well as packet blocking per service type (port #), content location (URL), folder, source address, destination address, and cryptographic association. The firewall 122*c* may also include firewall functions such as application proxies. The ServiceNet can also be separated into multiple small zones-of-trust, by applying separate VLAN 126 segments for each workgroup application server 28, so called path isolation. This makes it possible to separate workgroup application servers 28 with different security profiles to separate subnets, creating small service-boundary perimeters that alleviate the danger of attacks within the trusted zone.

Figure 13:
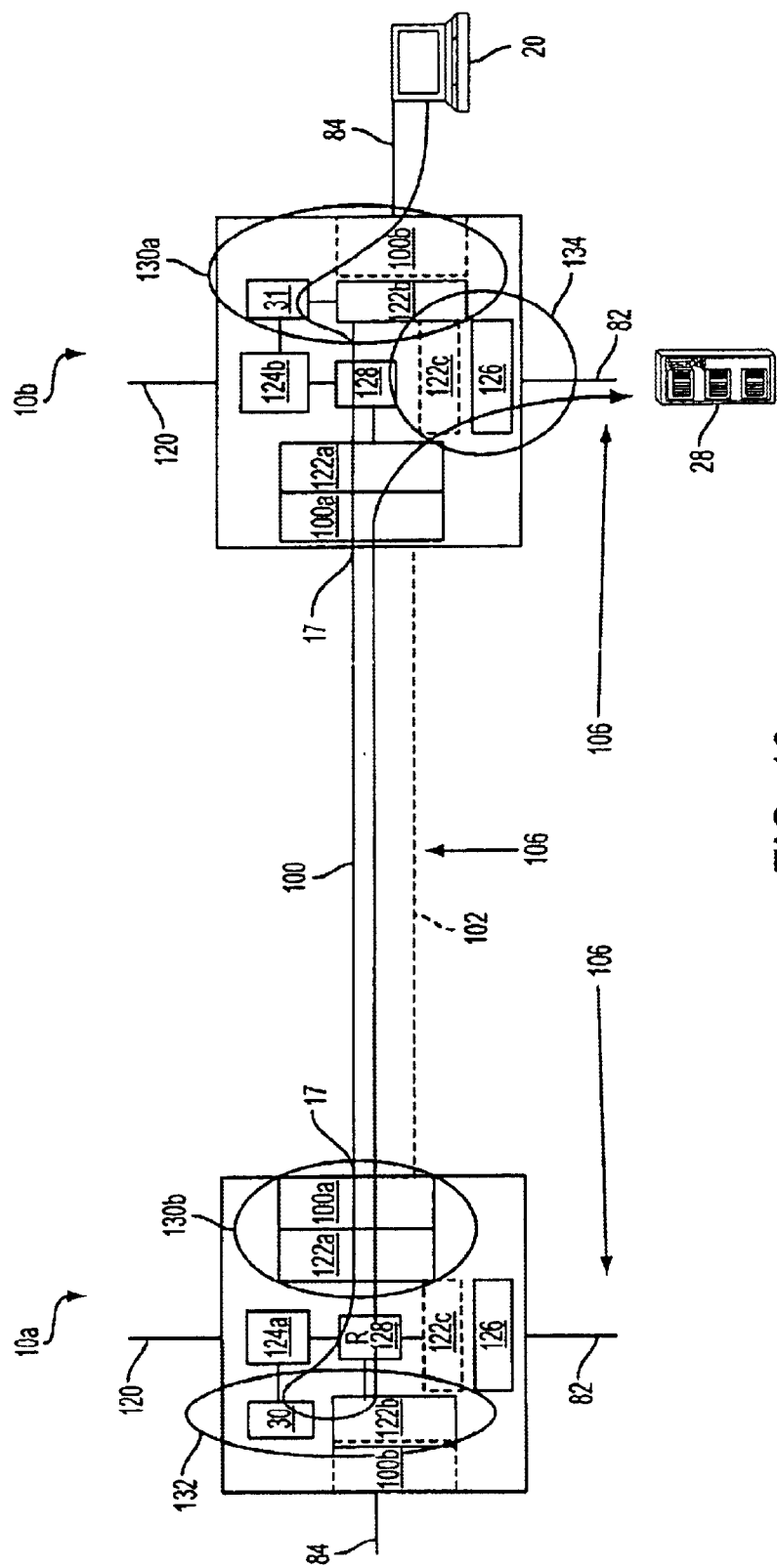
FIG. 13 is a flowchart diagram presenting the security aspects in the extranet traffic case of a mobile workgroup system.

FIG. 13 is an example flowchart diagram describing the steps that are taken to secure a mobile workgroup system, when each site is under separate administrative authority. Separate administration domains are normally called for in an extranet solution as it involves multiple companies. Additionally, the flowchart diagram illustrates what happens when a mobile client 20 is visiting a foreign Site 2 and wants to access the local server resource 28 made available to the protected Workgroup Network Tier 106. Note that having only one single administrative authority, in the form of an Internet Service Provider, which controls resources for both companies in one mobile service manager 22, can also solve an extranet service. However, let us go back to the more complex example with separate administration as shown in FIG. 13. The following steps are then performed.

1. Pre-establishment of MVPN tunnel 100 across Internet 17.

2. Pre-established static routes in Routing Engine 128 for cross-site routing of SVR2 28 and MC1 20 addresses.

3. Pre-binding of DNS 124*a* at Site 1 and DNS 124*b* at Site 2.

4. MC1 20 registers with FA 31, which forwards request across MVPN tunnel 100 to HA 30.

5. HA 30 performs MC1 20 mobile user 14 authentication including challenge-response authentication.

6. HA 30 updates the MC1 20 resource record in DNS 124*a* using dynamic DNS.

7. HA 30 sets workgroup source ingress filtering in firewall 122*b* at Site 1.

8. HA 30 sends back registration response to MC1 20 via FA 31.

9. MC1 20 makes a DNS query to Site 1 DNS 124*a* for resource record of SVR2 28 across MVPN tunnel 100.

10. DNS 124*a* refers request to Site 2 DNS 124*b* across logical WG tunnel 102.

11. MC1 20 sends user traffic to SVR2 28 via FA 31-MVPN tunnel 100-HA 30-FW 122*b* Site 2-logical WG tunnel 106-FW 122*c* Site 2-VLAN 126 Site 2.

The following text explains each step in more detail.

Two partners having separate mobile service managers 22 and MgmtNets 120 need to exchange the following contractual information before providing the mobile workgroup service between Site 1 and Site 2. The hostname (or alternatively IP address) of mobile service routers 10 to interconnect is exchanged as is the session-negotiation keys for encrypting the MVPN tunnels 100. The set of protocols to be allowed across the MVPN tunnel 100 are specified and configured into the firewalls 122*a*. Workgroup service filter restrictions 54 are mutually decided between the partners and then configured in the dynamic firewall 122*b*. The workgroup service filters 54 will take into account IP address (range) of server resources 28 at each site and IP address (range) of mobile clients 20 authorized to roam into partner domain. Note that the actual mobile client 20 IP address is not tied to the service workgroup filter at configuration time, but only after the authenticated mobile IP 44 registration has been performed. This limits substantially the window for an attacker trying to steal the mobile client's 20 IP address to get access into the workgroup 26.

The registration portion of the extranet flowchart starts with the mobile client 20 registering with the foreign agent 31 on the insecure AccessNet 84 of Site 2. The foreign agent 31 forwards the registration request across the MVPN tunnel 100 to the home agent 30 for user authentication. If the user authentication is successful, the home agent 30 updates the resource record in the dynamic DNS 124*a* as well as the dynamic workgroup filter 122*b* with the allocated mobile client 20 home IP address. The registration portion of the flowchart ends when the home agent 30 sends a registration reply message to the mobile client 20 via the foreign agent 31.

The client-server session portion of the flowchart starts with the mobile client 20 making a DNS query for the server resource 28 to the DNS 124*a* across the MVPN tunnel 100. The DNS 124*a* refers the request to the DNS 124*b* that hosts the resource record for the server resource 28. This referral goes across a logical workgroup tunnel 102. The logical WG tunnel 102 merely consists of the ingress filtering in firewall 122*b* and the MVPN tunnel 100 between the mobile service routers 10. The mobile client 10 receives the IP address of the server resource 28 in the DNS reply from the DNS 124*b* and establishes a service session with the server. In order to keep high security in the extranet, the traffic between the mobile client 20 and the server resource 28 is propagated across the MVPN tunnel 100, passing the "home" workgroup filter 122*b*. As stated earlier, the resource owning party of Site 2 may optionally utilize an extra firewall filter 122*c* and VLAN separation 126 to minimize the risk for attacks on the ServiceNet 82.

Figure 14:
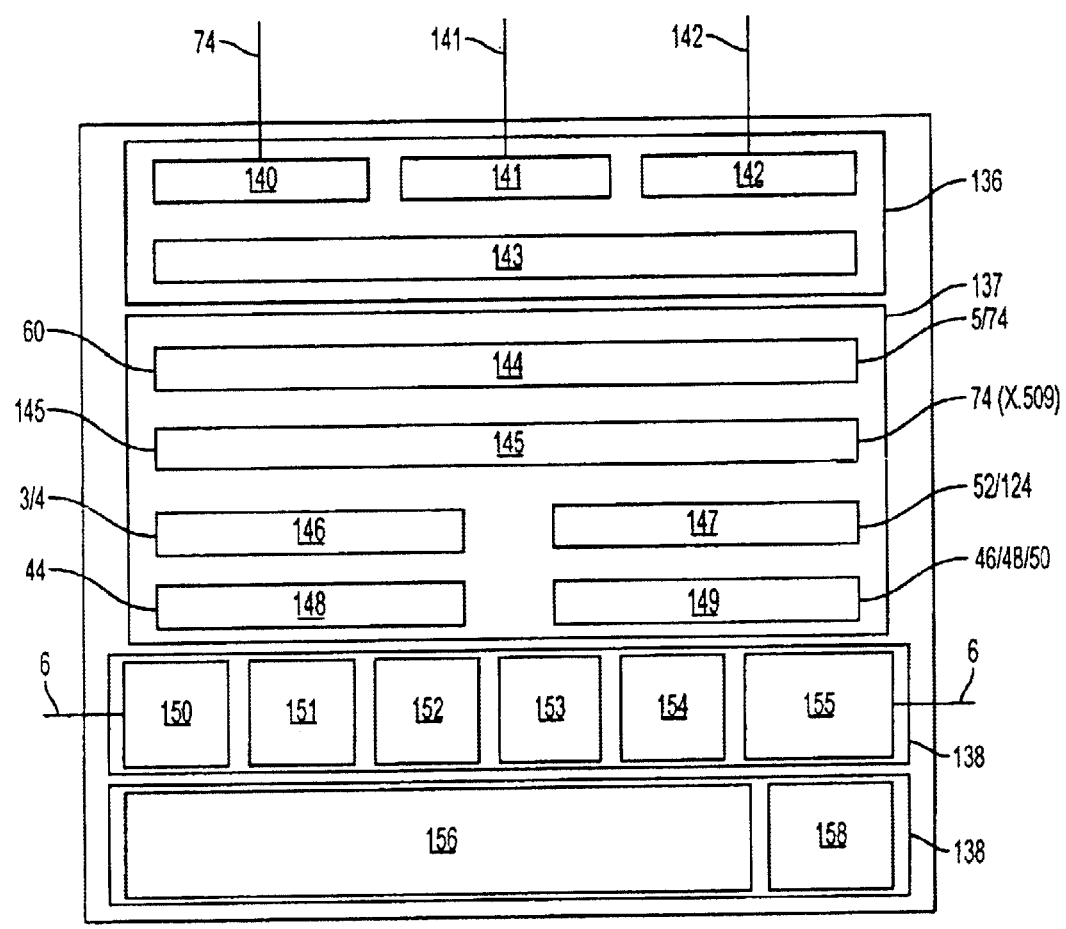
FIG. 14 is a function block diagram illustrating in further detail the components of the mobile service router.

FIG. 14 shows all the components in the mobile service router 10. The mobile service router 10 is divided into a management engine 136, a control engine 137, a forwarding engine 138, and the kernel 139.

The management engine 136 includes a common interface to the rest of the system through the creation of a common management gateway 143. Each system component has a plug-in to the management gateway 143 in order to be managed from the MgmtNet 120. Three different interfaces are provided towards the MgmtNet 120. The policy agent 140 is utilizing LDAP (lightweight directory application protocol) 74 to allow network-wide workgroup service 26 configuration from a centralized mobile service manager 22. The command line interface—secure shell (CLI-SSH) 141 allows for detailed configuration of all variables of the mobile service router 10 either from a local console or a remote workstation. A special selector is available as part of the CLI-SSH 141 in order to determine if the mobile service router 10 shall act as a slave to the policy agent 140 or if the CLI-SSH 141 shall be able to override the service configuration commands. This facility ensures that the mobile service router 10 and the mobile service manager 22 are synchronized when it comes to the set of workgroup services 54 configured. The SNMP agent 142 is the last component of the management engine 136. It provides a generic interface for performance and fault reporting to an operator's management system.

The servers in the control engine 137 have the following responsibilities. The mobility manager 148 supports the mobile IP protocol 44 and maintains a user authenticated security association with the mobile client 20 and/or other mobile IP 44 agent. The directory agent 147 is a location server that maintains a mapping between names (including workgroup members 20 & 16 and resources 28) and IP addresses given by the configuration server 146. The directory agent 147 acts as the end-server in the DNS 124 hierarchy for the workgroups 26. The directory agent 147 also discovers service resources on the network using the service location protocol (SLP) 52 and holds a centralized repository for advertised services. The communication controller 149 controls the firewall & routing functions in the system. The communication controller 149 establishes routes by using OSPF 46, BGP 48 and mobility routing protocols 50 as well as enforces workgroup policies to apply to packets. It relies on the directory agent 147 to find IP addresses for destinations 52 mentioned in the workgroup service profile 26. The configuration server 146 supports dynamic host configuration protocol (DHCP) 3 and realm-specific IP (RSIP) 4 for temporary IP address allocation. The configuration server 146 maintains an IP address pool from which it can allocate addresses to individual mobile clients 20. The configuration server 146 may configure the mobile client 20 with other options such as default DNS, web server, etc. The configuration server 146 updates the directory agent 147 of a new or changed IP address. The configuration server 146 can also provide session specific IP addresses for the purpose of global reachability. In an IPv6 network, the mobile client 20 can alternatively generate its own IP address based on the network prefix and a selected node index 52 based on the mobile clients 20 MAC address. The AAA (Authentication, Authorization and Accounting) server 144 and the IKE (Internet Key Exchange) server 145 are used by all other entities as help functions in order to establish and verify security associations. The AAA server 144 can also act as a broker to an external RADIUS 5, DIAMETER 60 or LDAP 74 server.

The forwarding engine 138 is responsible for forwarding the packet payload 6 that is traversing the mobile service router 10. The forwarding engine 138 includes an IPSec blade 150, which performs per packet authentication and/or encryption in accordance with the IPSec standard. The security associations in the IKE server 145 control the IPSec blade 150. After decrypting a packet, it is time to encapsulate or decapsulate the mobile IP tunnel (MIP GRE) 151. This is performed according to rules set by the mobility manager 148. The packet is now prepared for going through a workgroup service filter 26 in the virtual firewall (V-FW) 152. The communication controller 149 sets the rules in the virtual firewall 152. Many different rules may apply. One specific filter is a session initiation protocol (SIP) filter for interactive real-time traffic that controls who can call who in the mobile VPN 18.

The communication controller 149 is also responsible to set the preferred route for a destination. This route information is utilized in the forwarding table (FT) 153. The forwarding table 153 includes routes for mobile clients 20, workgroup server resources 28 and other routing elements (e.g. mobile service routers 10). In the case of traffic going from one private address domain to a different private address domain (e.g. in the case of an extranet) or to a public IP address domain (e.g. in the case of the Internet 17), the IP gateway (IPG) performs a network address translation of the IP addresses to ensure that the packet has a unique identity in both networks. The same applies in case one network is IPv4-based and another is IPv6-based, in which case the IP gateway 154 performs the translation between the two domains. The communication controller 149 controls the IP gateway 154. The communication controller 149 also instructs the quality of service function in the mobile service router 10, namely the classifier/scheduler 155, what to do. The classifier/scheduler 155 optionally re-marks, prioritises and queues packets based on the mobile client's 20 workgroup memberships 26 for further transport out on an outgoing interface.

The kernel portion of the system 139 includes both the operating system 156 and various support functions such as the syslog function 157 as shown in FIG. 14. The operating system 156 is controlling the execution of all other daemons in the mobile service router 10 and includes a scheduling algorithm per daemon that makes the mobile service router 10 survive attacks on individual daemons. The syslog function 157 receives events from all other daemons of the system and categorizes them into alarms with different severity levels. Some events are only logged locally, while other events are sent to the operators management system through the SNMP agent 142.

Figure 15:
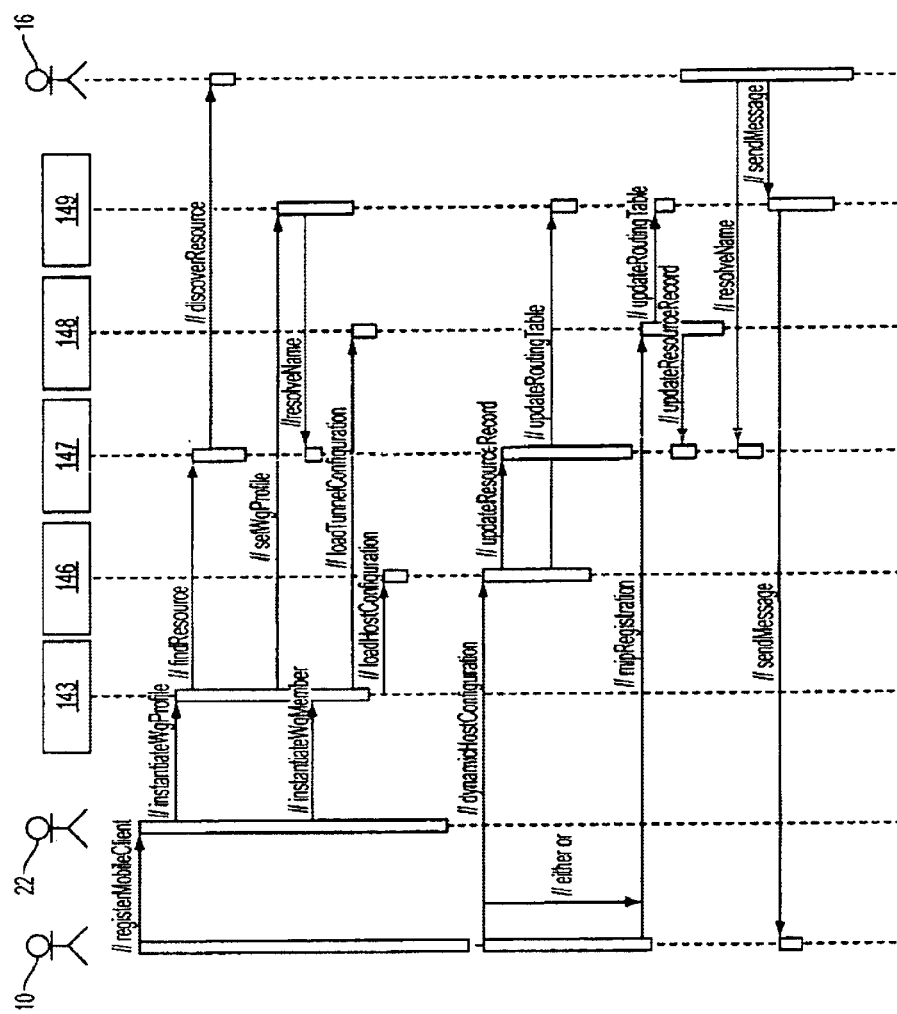
FIG. 15 is a flowchart diagram illustrating the interaction between the components of the mobile service router at mobile client configuration and registration.

FIG. 15 is a flowchart diagram showing the interactions between the mobile client 20, the mobile service manager 22, a correspondent node 16 and the individual components of the control engine 137 of the mobile service router 10. At configuration time, the mobile client 20 registers with the mobile service manager 22 in order to become part of a workgroup 26. This is done at the self-service management window of the mobile service manager 22 using the physically secured security key imprinted by the mobile service manager 22 for the delegation of partial control of the mobile workgroup system to the mobile client 20. Assume that the workgroup 26 that the mobile client 20 wants to be part of is new and therefore needs to be created. The mobile service manager 22 may need to notify an authorized workgroup administrator before the requested action can be performed. After an acceptance is received from the workgroup administrator, the mobile service manager 22 instantiates the new workgroup profile through the management gateway (MG) 143, which in turn tells the directory agent (DA) 147 to find the resource specified in the workgroup profile. The directory agent 147 discovers the resource as being the correspondent node 16 and stores the resource name to IP address mapping in a resource record. When the management gateway 143 gets an acknowledgement from the directory agent 147 that the resource is successfully discovered, it initiates an update of the communication controller (CC) 149 to set a firewall filter and route entry for the resource. The communication controller 149 looks up the IP address of the resource name during regular intervals in the directory agent 147, which in turn actively polls for availability information of the correspondent node 16. Now when the workgroup filter is successfully installed, the management gateway 143 can receive workgroup membership registrations from the mobile service manager 22. The management gateway only has to load host configuration and tunnel data for the mobile client 20 in the configuration server (CS) 146 and mobility manager (MM) 148 respectively.

The mobile service router 10 is now set to receive the first online registration from the mobile client 20. If the mobile client 20 is on its home network, the first registration involves a host configuration, in order to provide the mobile client 20 with an IP address. This is illustrated in FIG. 15 by the dynamic host configuration message from the mobile client 20 to the configuration server 146. The configuration server 146 in turn updates the directory agent 147 and communication controller 149 with the new entry. For a mobile client 20 on a remote network, the host configuration is replaced by a mobile IP registration 44 from the mobile client 20 to the mobility manager 148. The mobility manager 148 updates the routing table in the communication controller 149 and the mobile client 20 resource record in the directory agent 147 in order to allow peers, such as the correspondent node 16, to find and initiate sessions to the mobile client 20. As an example of the latter, the correspondent node 16 queries the directory agent 147 for the IP address of the mobile client 20 name. The correspondent node 16 then sends packets towards the mobile client 20. These packets are filtered and routed by the communication controller 149 (to be more correct the forwarding components controlled by the communication controller). As the communication controller 149 has been updated with the workgroup filter—to allow the correspondent node 16 to send packets to the workgroup—and with the IP address that the mobile client 20 is currently allocated, the communication controller 149 lets the traffic through to the mobile client 20.

FIG. 16 shows a detailed flowchart for the case when the mobile client 20 is registering to a mobile service router 10b in a foreign network using the mobile IP 44. The mobile client 20 sends a router solicitation message when entering the foreign network in order to discover a foreign agent 31. The mobile service router 10b receives the router solicitation and responds with a router advertisement including a challenge. The mobile client 20 may receive multiple router advertisements and selects one of them to send a registration request to. The mobile client 20 includes its network address identifier (NAI) and a response to the challenge in the registration request. The response to the challenge is calculated with a key that the client shares with the data storage 70 in the home network. The mobile service router 10b verifies that the registration request uses a recent challenge and that the mobile client 20 has not used the challenge before. This is done in order to avoid replay attacks. The mobile service router 10b uses the DIAMETER 60 authentication and authorization (AA) protocol to find the home agent 30 for the mobile client 20. The mobile service router 10a receives the AA mobile client request and makes a LDAP lookup in the data storage 70 of the mobile VPN 18. The mobile service router 10a verifies the response to the challenge using the mobile client 20 shared key that it received from the data storage 70. If successful, the AA mobile client answer to the foreign agent 31 includes a set of session keys for protecting the communication between the mobile client 20 and the mobile service routers 10a and 10b. The DIAMETER protocol ensures a secure transfer of these session keys from the mobile service router 10a to 10b. The mobile service router 10b can now send a registration reply to the mobile client 20. The registration reply includes among other things the home network IP address allocated to the mobile client 20.

The mobile client 20 may optionally request for additional configuration information from the mobile service router 10a through the use of the dynamic host configuration protocol (DHCP). The mobile client 20 then sends DHCP inform requests to get information such as default DNS, default Web server, etc.

In order to protect the payload, the mobile client 20 may initiate Internet key exchange (IKE) towards the mobile service routers 10a and 10b based on public-private key pairs or shared secrets. The IKE aggressive mode generates a shared session key from a public-private key pair or pre-shared secret, while the IKE quick mode establishes the security association. IKE phase 1 (main or aggressive mode) generates and establishes a channel wherein two nodes can communicate in a secure and authenticated way. This is called the establishment of a phase 1 SA. The phase 1 SA is based on either a shared secret between the nodes or a public-private key pair. IKE phase 2 (quick mode) uses the phase 1 SA in order to, in a secure way, set up new SAs for services such as IPSec, i.e. establishes the security associations used for the user communication.

Finally, the mobile client 20 may be required to login to individual servers. In FIG. 16 this is exemplified by the use of a Windows NT back office login to the correspondent node 16.

What is claimed is:

1. A network-based mobile workgroup system comprising:
a plurality of mobile client nodes, each mobile client node providing an interface for user interaction by a mobile user;
a plurality of mobile service router nodes, each mobile service router node providing a mobile Virtual Private Network (VPN) to the mobile client nodes spanning multiple router hops and sites;

a network address identifier (NAI) with which a user of a mobile client is uniquely identified to the mobile VPN system; and a set of firewall filters and route policies with which the workgroup is protected, wherein the mobile VPN provides each mobile client secure data access to the VPN and provides secure data access to each mobile client from within the mobile VPN, wherein a point of attachment of any mobile client node to the mobile VPN may change without affecting that mobile client node's participation in the mobile VPN.

2. The mobile workgroup system of claim 1, wherein the network address identifier is used to authenticate the mobile user at start and during the continuation of a network login session and wherein the firewall filters and route policies are applied to the forwarding of packets based on the mobile user's workgroup memberships.

3. The mobile workgroup system of claim 2, wherein an IP address allocated to the mobile client is tied to the network address identifier of the mobile user.

4. The mobile workgroup system of claim 3, wherein the allocated IP address for each mobile client is kept stable during the duration of a network login session and used in the mobile service router as a identifier of workgroup filters to apply to a packet.

5. The mobile workgroup system of claim 4, wherein a specific IP address is an IPv6 address where one portion of the address indicates mobile VPN system and another mobile client identity.

6. The mobile workgroup of claim 4, wherein a specific IP address is an IPv4 address where the IP address range from which the address is selected indicates mobile VPN system.

7. The mobile workgroup system of claim 4, wherein the participating nodes can communicate using intra-domain, inter-domain or remote access routing.

8. The mobile workgroup system of claim 7, wherein a node first attempts to establish intra-domain routing with the mobile workgroup data network;

wherein inter-domain routing is attempted in case intra-domain routing is not available;

wherein remote access is seen as last resort.

9. The mobile workgroup system of claim 8, wherein intra-domain routing between participating nodes in a mobile VPN home network is based on flat (non-hierarchical), mobile adhoc network (MANET) routing techniques.

10. The mobile workgroup system of claim 9, wherein one specific metric for route calculation is quality of service.

11. The mobile workgroup system of claim 9, wherein one specific mobile adhoc routing technique includes the Topology Broadcast based on Reverse-Path Forwarding (TBRPF) protocol.

12. The mobile workgroup system of claim 9, wherein one specific mobile adhoc routing technique includes the Core-Extraction Distributed Ad Hoc Routing (CEDAR) protocol.

13. The mobile workgroup system of claim 9, wherein one specific mobile adhoc routing protocol technique includes the Adhoc On-demand Distance Vector (AODV) protocol.

14. The mobile workgroup system of claim 9, wherein one specific mobile adhoc routing technique includes multicasting and groupcast (xcast) protocols for the purpose of sending messages to all or selected members of a workgroup.

15. The mobile workgroup system of claim 14, wherein the multicast address resolution protocol is used to discover a node for subsequent unicasting of packets to same node.

16. The mobile workgroup system of claim 14, wherein one specific routing algorithm to obtain lowest cost to reach a set of destinations is based on a branch and cut algorithm for solving Steiner tree problems.

17. The mobile workgroup system of claim 9, further comprising routing between:

mobile client—mobile client;

mobile client—mobile service router;

mobile service router—mobile service router.

18. The mobile workgroup system of claim 17, wherein multiple paths are available for routing to and from a multi-homed node.

19. The mobile workgroup system of claim 18, wherein the selection of next-hop node for a route in the workgroup network is decided on;

a per destination basis;

Quality of service preferences;

Security preferences;

Protocol/application type.

20. The mobile workgroup system of claim 19, wherein any node (mobile client and mobile service router) may change primary point of attachment to the workgroup home network without changing IP address.

21. The mobile workgroup system of claim 20, wherein changing point of attachment is treated as a routing update;

wherein a link-state routing update may be due to forced handoff initiated by the underlying link or IP tunneling layer technology; and wherein a change of point of attachment may be due to a volunteer handoff initiated by the intra-domain routing process when discovering a stable, new optimal route to all workgroup nodes across alternative links or IP tunnels;

wherein either handoff style causes temporary replication of sent data packets from and towards the moving node over both old and new route in the mobile virtual private network.

22. The mobile workgroup system of claim 21, wherein forced handoff at the link layer initiates partitioning at the routing layer in case no route is discovered during a configured interval to a subset of the workgroup nodes; and wherein the discovery of a new link initiates merging of partitions at the routing layer in case nodes from both partitioning are part of the same workgroup.

23. The mobile workgroup system of claim 8, wherein inter-domain routing is performed through encapsulation of intra-domain packets in a tunneling protocol between foreign and home mobile service router following a handshake via any number of AAA proxies.

24. The mobile workgroup system of claim 23, further comprising:

authentication, authorization and accounting between foreign mobile service router and home mobile service router based on the DIAMETER protocol;

authentication, authorization and accounting between foreign mobile service router and home mobile service router based on the RADIUS protocol;

authentication and mobility management between the mobile client, the foreign mobile service router and the home mobile service router based on the Mobile IP protocol.

payload encryption, authentication and compression between mobile client and the foreign and home mobile service router respectively using the IPSec protocol.

25. The mobile workgroup system of claim 24, wherein the mobile user information data storage is separated from the home mobile service router.

26. The mobile workgroup system of claim 25, wherein multiple home mobile service routers may act as AAA servers for the same user through the use of a common data storage.

27. The mobile workgroup system of claim 26, wherein the selection of home mobile service router acting as DIAMETER server is based on routing information, further comprising:
   Route preference of each mobile service router for IPv4 networks;
   Shared anycast address for all mobile service routers in IPv6 networks.

28. The mobile workgroup system of claim 26, wherein the geographic vicinity of the mobile client with regards to available home mobile service routers is determined by the use of a spatial location protocol.

29. The mobile workgroup system of claim 26, wherein the home mobile service router is kept the same at change of point of attachment in foreign domain.

30. The mobile workgroup system of claim 29, wherein the selection of mobile service router is re-computed when roaming into a new foreign domain.

31. The mobile workgroup system of claim 8, wherein remote access from non-workgroup aware Internet environment is allowed for both mobile client and mobile service router.

32. The mobile workgroup system of claim 31, further comprising:
   mobility service router discovery and security negotiation using the Security Policy Protocol (SPP);
   authentication and mobility management using the Mobile IP (MIP) protocol applied with the co-located care of address option;
   payload authentication, encryption and compression using the IPSec protocol.

33. The mobile workgroup system of claim 32, wherein the policy server function is placed in the mobile client and the mobile service router.

34. The mobile workgroup system of claim 33, wherein the security gateway is placed in the mobile service router.

35. The mobile workgroup system of claim 34, wherein the node attempting mobile service router discovery sets the destination to a well-known name for the workgroup and can retrieve a set of IP addresses of available mobile service routers from the domain name system.

36. The mobile workgroup system of claim 35, wherein discovery of and negotiation with intermediate security gateways is performed during the security policy protocol exchange towards the discovered mobile service router.

37. The mobile workgroup system of claim 36, wherein the intra-domain routing protocol is applied on top of the remote access technique.

38. The mobile workgroup system of claim 1, wherein the mobility workgroup service is provided independently of mobility services offered by a radio access technology specific network.

39. The mobile workgroup system of claim 38, wherein the radio access technology specific network includes Wireless LAN and HiperLAN2.

40. The mobile workgroup system of claim 38, wherein the cellular access technology specific network includes IMT-2000 based systems like UMTS and cdma2000.

41. The mobile workgroup system of claim 38, wherein the data network is operated by an Internet Service Provider (ISP) utilizing a centralized mobile service manager.

42. The mobile workgroup system of claim 41, wherein extranet workgroups are created through the aggregation of workgroups from different organizations in the same mobile service manager.

43. The mobile workgroup system of claim 38, further comprising:
   service access control to intranet and internet services;
   secure access connectivity option to neighbor node;
   service provisioning based on physical location;
   quality of service differentiation based on workgroup membership;
   interactive real-time communication services between workgroup members.

44. The service access control service of claim 43, wherein a firewall profile is downloaded from the mobile service manager to all nodes allocated to the workgroup.

45. The mobile workgroup system of claim 44, wherein Internet access is provided via any of the nodes allocated to the workgroup using Internet routing protocols.

46. The mobile workgroup system of claim 45, wherein the Internet routing protocols include Open Shortest Path First (OSPF).

47. The mobile workgroup system of claim 45, wherein the Internet routing protocols include Border Gateway Protocol (BGP).

48. The mobile workgroup system of claim 45, wherein the route metrics from the Internet routing protocol is propagated into the workgroup intra-domain routing protocol.

49. The mobile workgroup system of claim 44, wherein threshold-based scanner protection is applied in all nodes allocated to the workgroup to protect against attacks towards the workgroup data network from the Internet.

50. The mobile workgroup system of claim 43, wherein every packet is authenticated and/or encrypted using the IPSec protocol.

51. The mobile workgroup system of claim 43, wherein wildcards are added in the service profile when downloaded from the mobile service manager to the workgroup nodes.

52. The mobile workgroup system of claim 51, wherein the mobile service router acts as a directory agent using the Service Location Protocol to discover services from local service agents.

53. The mobile workgroup system of claim 51, wherein the mobile service routers allocated to a workgroup provides consistent domain names for services in the profile.

54. The mobile workgroup system of claim 51, wherein the mobile service routers update their domain name service resource records with the results of the local service discovery process and the mobile clients caches correspondent resource records for later use.

55. The mobile workgroup system of claim 43, wherein all workgroup members share the same quality of service profile.

56. The mobile workgroup system of claim 55, wherein all nodes allocated to a workgroup applies the same quality of service profile.

57. The mobile workgroup system of claim 56, wherein the quality of service differs based on application type.

58. The mobile workgroup system of claim 55, wherein a distributed weighted fair queuing schema is applied among neighbor nodes.

59. The mobile workgroup system of claim 58, wherein cause of packet loss due to random error on radio link is made known to the Transport Control Protocol (TCP) implementation running on the mobile client.

60. The mobile workgroup system of claim 59, wherein the mobile client TCP implementation ignores packet loss due to random error when determining window size.

61. The mobile workgroup system of claim 55, wherein quality of service statistics are collected from the workgroup nodes to the mobile service manager in order to follow-up service level agreements.

62. The mobile workgroup system of claim 43, wherein mobile service routers maintain stable domain name resource records for all members of a workgroup and mobile clients caches such resource records for later use.

63. The mobile workgroup system of claim 62, such as multimedia services wherein voice over IP is one service.

64. The mobile workgroup system of claim 63, wherein the technology specific protocols include the Session Initiation Protocol (SIP).

65. The mobile workgroup system of claim 64, wherein the nodes belonging to a workgroup applies a SIP filter downloaded from the mobile service manager applying encryption only to control communication.

66. The mobile workgroup system of claim 63, wherein the technology specific protocols include the xcast protocol suite for small group multicasting.

67. The mobile workgroup system of claim 38, wherein the security solution is based on a separation of each site of the mobile virtual private network into two parts, further comprising:
   an access network acting as a shared media for workgroup members and non-members to access the site;
   a service network acting as a safe repository for workgroup server resources at the site.

68. The mobile workgroup system of claim 67, wherein one or several mobile service routers perform user authentication, policy routing and packet filtering of traffic between the access and service network in a site based on a mobile user's workgroup memberships.

69. The mobile workgroup system of claim 68, wherein mobile service routers placed at the border of the mobile virtual private network also provide firewall protected interfaces to the Internet and a de-militarized zone (DMZ).

70. The mobile workgroup system of claim 68, wherein the mobile IP home network for the mobile client is defined as a service network protected by one or more mobile service routers.

71. The mobile workgroup system of claim 68, wherein the mobile home network for the mobile client is defined as a virtual home network hosted by one or several mobile service routers.

72. The mobile workgroup system of claim 69, wherein a three tier security architecture is defined, further comprising:
   a mobile virtual private network tier encompassing service and access networks at each mobile VPN site as well as the tunnels connecting the sites;
   a workgroup network tier protecting the workgroup peer-to-peer and client-server traffic in the mobile VPN from attacks;
      a service network tier protecting workgroup servers at a single mobile VPN site against attacks as well as separating specific workgroup applications from each other using virtual local area networks.

73. The mobile workgroup system of claim 72, wherein the entry barrier to the mobile VPN Tier is a one-way network address translation (NAT) gateway for Internet traffic and an IPSec-based tunnel limited by at least protocol type and source IP addresses.

74. The mobile workgroup system of claim 72, wherein a mobile client is required to go through a user authentication and a per packet workgroup filtering in order to enter the workgroup network.

75. The mobile workgroup system of claim 74, wherein the workgroup filtering includes functions like static packet filtering.

76. The mobile workgroup system of claim 74, wherein the workgroup filtering includes functions like dynamic packet filtering.

77. The mobile workgroup system of claim 74, wherein the workgroup filtering includes functions like application level proxy filtering.

78. The mobile workgroup system of claim 72, wherein a packet filter controls the entrance to the service network using site-local application restrictions and optional end-to-end secure socket layer (SSL) or similar cryptographic associations.

79. The mobile workgroup system of claim 67, wherein the closest mobile service router can push security policy information, extracted from an external source, to a mobile client.

80. The mobile workgroup system of claim 67, wherein the closest mobile service router extracts security policy information that is dynamically obtained during the registration of a mobile client, and thereafter enforce the security policy received.

81. The mobile workgroup system of claim 38, wherein the closest mobile service router acts as DHCP server for the subsequent workgroup home network configuration of the node.

82. The mobile workgroup system of claim 81, wherein the node is configured based on client id=network address identifier and user class=workgroup.

83. The mobile workgroup system of claim 82, wherein the node can be configured with:
   IP address(es)
   Subnet mask(s)
   Broadcast address(es)
   Host name
   Domain name
   Domain Name Server
   Time offset
   Servers (e.g. SMTP, POP, WWW, DNSINIS, LPR, syslog, WINS, NTP)
   Mobile Service Router(s)
   Router discovery options
   Service Location Protocol Directory Agent
   Static routes
   MTU
   Default TTL
   Source routing options
   IP Forwarding enable/disable
   PMTU options
   ARP cache timeout
   X Windows options
   NIS options
   NetBIOS options
   Vendor-specific options.

84. The mobile workgroup system of claim 83, wherein a set of mobile service routers allocated to a workgroup share DHCP schema tree, address pool and fail-over support.

85. The mobile workgroup system of claim 38, wherein the reachability of the mobile client is ensured via the Dynamic DNS protocol.

86. The mobile workgroup system of claim 38, further comprising a self-service management window for mobile users and workgroup administrators to control workgroup profiles and exchange information.

87. The mobile workgroup system of claim 86, wherein the mobile service router redirects a request for the browser default web page to said self-service management portal.

88. The mobile workgroup system of claim 87, wherein the workgroup administrator can define workgroup based on available service policies and mobile service routers.

89. The mobile workgroup system of claim 88, wherein the mobile user can request and the workgroup administrator can accept workgroup membership.

90. The mobile workgroup system of claim 89, wherein the workgroup administrator can import mobile user data of members from external user directory.

91. The mobile workgroup system of claim 90, wherein the workgroup administrator can provide further information in the form of links to downloadable scripts and software packages applicable to the workgroup.

92. The mobile workgroup system of claim 91, wherein the mobile user can personalize his own profile.

93. The mobile workgroup system of claim 38, wherein the mobile service manager imprints a physically secured security key for each mobile user and network administrator to use within the workgroup through the physical insertion into the mobile service manager management port.

94. The mobile workgroup system of claim 93, wherein the mobile service manager can reprint the physically secured security key.

95. The mobile workgroup system of claim 94, wherein the mobile service manager may imprint policies into the physically secured security key for delegating partial control for self-service management to mobile clients.

96. The mobile workgroup system of claim 95, wherein the physically secured security key includes shared secrets for authentication and encryption of control and payload traffic towards other nodes in the mobile workgroup system.

97. The mobile workgroup system of claim 95, wherein the physically secured security key includes certificates, private and public keys for authentication and encryption of control and payload traffic towards other nodes in or outside the mobile workgroup system.

98. The mobile workgroup system of claim 95, wherein the mobile user and network administrator also is given a PIN code for accessing the security key.

99. The mobile workgroup system of claim 98, wherein the mobile user plugs the security key into the management port of the node's hardware and opens it up for use by entering the PIN code on the control panel.

100. The mobile workgroup system of claim 99, wherein manual typing of security keys into mobile client control panel is available as fallback alternative.

101. The mobile workgroup system of claim 100, wherein a secure intra-domain link, inter-domain mobile IP tunnel or remote access tunnel can be established between the node and another node belonging to the same workgroup based solely on the information stored in the security keys.

* * * * *

UNITED STATES PATENT AND TRADEMARK OFFICE
CERTIFICATE OF CORRECTION

PATENT NO. : 6,954,790 B2 Page 1 of 1
DATED : October 11, 2005
INVENTOR(S) : Jan Forslöw It is certified that error appears in the above-identified patent and that said Letters Patent is hereby corrected as shown below:

Column 26,
Line 43, replace "DNSINIS" with -- DNS/NIS --.

Signed and Sealed this

Thirtieth Day of May, 2006

JON W. DUDAS
*Director of the United States Patent and Trademark Office*